US009896356B2

(12) United States Patent
Smith et al.

(10) Patent No.: US 9,896,356 B2
(45) Date of Patent: Feb. 20, 2018

(54) ELECTROKINETIC PROCESS FOR CONSOLIDATION OF OIL SANDS TAILINGS

(71) Applicant: Electro-Kinetic Solutions, Inc., Toronto (CA)

(72) Inventors: Gregory J. Smith, Woodridge, IL (US); Bruce S. Beattie, Vista, CA (US); Robert C. Parrott, Knoxville, TN (US); James Micak, Aurora (CA); Paul Garcia, Temecula, CA (US); Doug Kimzey, Knoxville, TN (US); Thomas M. Kroll, Jr., Louisville, TN (US)

(73) Assignee: Electro-Kinetic Solutions Inc., Toronto, Ontario (CA)

( * ) Notice: Subject to any disclaimer, the term of this patent is extended or adjusted under 35 U.S.C. 154(b) by 308 days.

(21) Appl. No.: 14/694,302

(22) Filed: Apr. 23, 2015

(65) Prior Publication Data
US 2015/0225263 A1 Aug. 13, 2015

Related U.S. Application Data

(62) Division of application No. 13/440,386, filed on Apr. 5, 2012, now abandoned.

(30) Foreign Application Priority Data

Apr. 7, 2011 (CA) ..................... 2736675
Nov. 16, 2011 (CA) ..................... 2758872

(51) Int. Cl.
*C02F 1/46* (2006.01)
*C02F 1/463* (2006.01)
(Continued)

(52) U.S. Cl.
CPC ............... *C02F 1/463* (2013.01); *C02F 1/52* (2013.01); *C02F 11/006* (2013.01);
(Continued)

(58) Field of Classification Search
CPC .......... C02F 1/463; C02F 1/52; C02F 11/006; C02F 11/125; C02F 2201/46135; C02F 2103/18; C02F 2103/10
See application file for complete search history.

(56) References Cited

U.S. PATENT DOCUMENTS 3,208,226 A 9/1965 Falvey
3,502,365 A 3/1970 Baillie
(Continued)

FOREIGN PATENT DOCUMENTS

CA 2549198 11/2007
CA 2590990 11/2007
(Continued)

OTHER PUBLICATIONS

Brevik, I, "Experiments in Phenomenological Electrodynamics and the Electromagnetic Energy-Momentum Tensor", Physics Reports, 1978, pp. 135-201.
(Continued)

*Primary Examiner* — Arun S Phasge
(74) *Attorney, Agent, or Firm* — Boyle Fredrickson, S.C.

(57) ABSTRACT

A method is provided of treating liquid tailings using electro-kinetics by creating a variable voltage between two electrodes in the tailings. Flocculation and water release from the tailings is induced by establishing an electrical field between the two electrodes. The electrodes are connected to an electrical power source having the variable voltage to create a cathode and an anode. Compacting the flocculation solids and removing further water released from the compacting solids allows for the creation of a compacted material having a desired load bearing capacity.

34 Claims, 12 Drawing Sheets

(51) Int. Cl.
| | |
|---|---|
| C02F 1/52 | (2006.01) |
| C02F 11/00 | (2006.01) |
| C02F 11/12 | (2006.01) |
| C02F 103/10 | (2006.01) |
| C02F 103/18 | (2006.01) |

(52) U.S. Cl.
CPC ........ *C02F 11/125* (2013.01); *C02F 2103/10* (2013.01); *C02F 2103/18* (2013.01); *C02F 2201/46135* (2013.01)

(56) References Cited

U.S. PATENT DOCUMENTS

| | | | |
|---|---|---|---|
| 3,767,046 | A | 10/1973 | Hartkkorn |
| 3,962,069 | A | 6/1976 | Inoue et al. |
| 4,107,026 | A | 8/1978 | Freeman |
| 4,110,189 | A | 8/1978 | Kunkle et al. |
| 4,134,820 | A | 1/1979 | Ellis et al. |
| 4,170,529 | A | 10/1979 | Freeman |
| 4,282,103 | A | 8/1981 | Fuhr et al. |
| 4,337,136 | A | 6/1982 | Dahlgren |
| 4,437,998 | A | 3/1984 | Yong |
| 4,501,648 | A | 2/1985 | Ritter |
| 4,623,442 | A | 11/1986 | Ritter |
| 4,960,524 | A | 10/1990 | Inculet et al. |
| 5,171,409 | A | 12/1992 | Barnier et al. |
| 5,621,844 | A | 4/1997 | Bridges |
| 6,179,977 | B1 | 1/2001 | Herbst |
| 6,596,142 | B2 | 7/2003 | McGee |
| 6,800,186 | B1 | 10/2004 | Forand et al. |
| 2002/0011436 | A1 | 1/2002 | Blanchette et al. |
| 2004/0026238 | A1 | 2/2004 | Ende et al. |
| 2004/0140218 | A1 | 7/2004 | Gavrel et al. |
| 2007/0204994 | A1 | 9/2007 | von Wimmersperg |
| 2007/0267355 | A1* | 11/2007 | Jones ..................... B01D 35/06 204/518 |
| 2009/0142137 | A1 | 6/2009 | Michailuck et al. |
| 2009/0288959 | A1 | 11/2009 | Nakano |
| 2010/0236931 | A1 | 9/2010 | Fernando |
| 2011/0155564 | A1 | 6/2011 | Oifman |
| 2012/0138511 | A1 | 6/2012 | Kimball et al. |
| 2012/0255872 | A1 | 10/2012 | Smith et al. |
| 2012/0292186 | A1 | 11/2012 | Adamson |
| 2014/0008229 | A1 | 1/2014 | Garcia et al. |
| 2014/0131206 | A1 | 5/2014 | Yazdanbod |

FOREIGN PATENT DOCUMENTS

| | | |
|---|---|---|
| CA | 2645091 | 5/2009 |
| CA | 2634841 | 12/2009 |
| CA | 2668784 | 12/2009 |
| CA | 2698880 | 10/2011 |
| CA | 2726098 | 10/2011 |
| CA | 2736196 | 10/2011 |
| CA | 2741020 | 2/2012 |
| CA | 2736675 | 10/2012 |
| CA | 2758872 | 10/2012 |
| CA | 2757955 | 5/2013 |
| CA | 2782949 | 1/2014 |
| CA | 2783819 | 4/2014 |
| CA | 2736675 | 8/2014 |
| DE | 3824289 | 11/1989 |
| JP | 06154762 | 6/1994 |
| JP | 06154764 | 6/1994 |
| JP | 2004190417 | 7/2004 |
| WO | 2008112493 | 9/2008 |
| WO | 2014008581 | 1/2014 |

OTHER PUBLICATIONS

Brevik, I, "Fluids in electric and magnetic fields: Pressure variation and stability", Canadian J. Physics, 60, 1982, pp. 449-445.
Suzuki et al, "Development of continuous Dehydrator for Fish Meat by Electroosmotic Method".
Mahmoud et al., "Electrical field: A historical review of its application and contributions in wastewater sludge dewatering", Water Research 44 (2010) 2381-2407.
Friehmelt et al., "Electrokinetic Dewatering Process for Industrial Sludge", BIOSYS—Institute of applied science, Vionvillestrasse 20, 28211 Bremen, Germany, 8 pages.
Guo et al., "A study of electrokinetic dewatering of oil sands tailings", Environmental Geotechnics, vol. 1, Issue EG2, pp. 121-134, May 1, 2014.
Hiler, "Electrokinetic Movement of Suspended Colloids in a Flowing Medium", The Ohio State University, Dissertation 1966, 88 pages.
Ishida et al., "Dielectric-Relaxation Spectroscopy of Kaolinite, Montmorillonite, Allophane, and Imogolite Under Moist Conditions", Clays and Clay Minerals, vol. 48, No. 1, 75-84, 2000.
Melloni, A. et al., "Direct measurement of electrostriction in optical fibers", Optics Letters, vol. 23, No. 9, May 1, 1988, pp. 691-693.
Rogers et al., "Acute and Subchronic Mammalian Toxicity of Naphthenic Acids from Oil Sands Tailings", Toxicological Sciences 66, 347-355 (2002).
Schroth et al., "Surface Charge Properties of Kaolinite", Clays and Clay Minerals, vol. 45, No. 1, 85-91, 1997.
Smith et al., "Monitoring Soil Consolidation During In Situ Electrical Resistivity Heating", Proceeding of the Fifth International Conference on Remediation of Chlorinated and Recalcitrant Compounds, May 22-25, 2006, Monterey, CA, 9 pages.
Mohamedelhassan et al., "Electrokinetic Sedimetation & Dewatering of Clay Slurries", Dec. 2008, 28 pages.
Cavendish, How It Works Science and Technology, 554 (2003).
BCG Eng., Inc., "Oil Sands Tailings Technology Review", Jul. 2010.
Bohm et al., "Water Management and the Use of Thickened Tailings", Sustainable Improvement in Safety of Tailings Facilities, Oct. 2005.
http://www.fkcscrewpress.com/spintro.html, Dec. 7, 2004.
Beier et al., "The Oil Sand Tailings Research Facility", Geotechnical News, Jun. 2008, pp. 72-77.
Mikula et al., "Water Use in Bitumen Production: Tailings Management in Surface Mined Oil Sands", Canadian International Petroleum Conference Paper 2008-097.
Reddy et al., "Overview of Electrochemical Remediation Technologies", ISBN 978-0-470-38343-8, John Wiley & Sons, Inc., New York, NY 2009.
Mohamedelhassan, "Electrokinetic Sedimentation and Dewatering of Clay Slurries", Dec. 2008.
Reddy et al., "Enhanced Electrokinetic Remediation of Heavy Metals in Glacial Till Soils Using Different Electrolyte Solutions", Journal of Enivronmental Engineering, ASCE/Apr. 2004, pp. 442-455.
Reddy et al., "Nutrient Amendment for the Bioremediation of a Chromium-Contaminated Soil by Electrokinetics", Energy Sources, 25:931-943, 2003.
Mikula et al., "Centrifuge Options for Production of 'Dry Stackable Tailing' in Surface Mined Oil Sands Tailings Management", Canadian International Petroleum Conference Paper 2008-095.
"Leopold Clari-Vac Floating Sludge Collector Simply Powerful Sludge Removal for Water and Wastewater Treatment Plants" ITT Advanced Water Treatment, Zelienople, PA, 2006.
Kantardjieff et al., "Improved Dewatering of Pulp and Paper Mill Sludges", 1997 Environmental Conference & Exhibit, pp. 723-727.
Hiler et al., "Electrokinetic Removal of Colloids from Suspension", Transaction of the ASAE 1965, pp. 79-82.
Hiler et al., "Electrokinetic Removal of Colloids from Suspension", Transaction of the ASAE 1965, pp. 79-32.
Lambe, "Soil Testing for Engineers", 1951, John Wiley & Sons, Inc., New York, NY, 89 pages.
Kosmulski, "Surface Charging and Points of Zero Charge", vol. 145, CRC Press, 2009, 5 pages.
Hough, "Basic Soils Engineering", Chapter 3, The Ronald Press Company, New York, NY, 1957, 36 pages.
Weast, Handbook of Chemisty and Physics, 56th Edition, CRC Press, Cleveland Ohio, 1975, 34 pages.
EP14852686.6, European Search Report, 13 pages, Jun. 2, 2017.

(56) References Cited

OTHER PUBLICATIONS

Energy Resources Conservation Board, Directive 074: Tailings Performance Criteria and Requirements for Oil Sands Mining Schemes, 2009.
Mujumdar, Handbook of Industrial Drying, 2006.

* cited by examiner

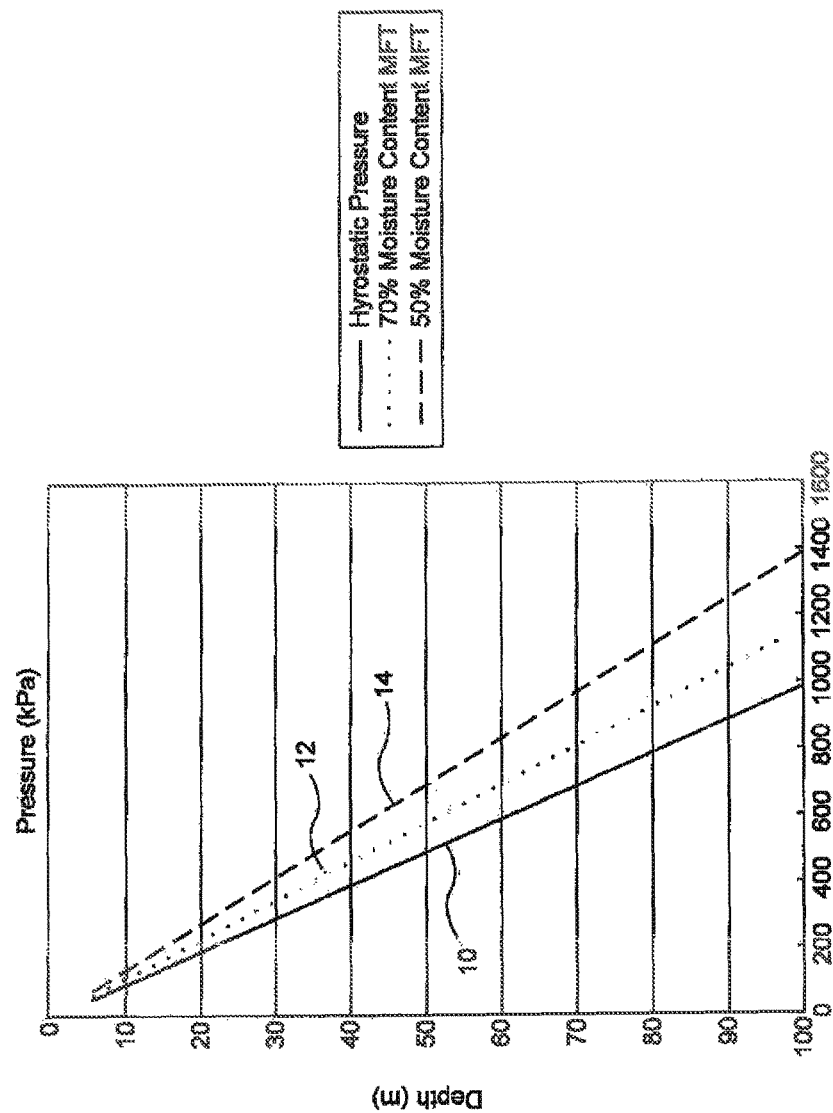

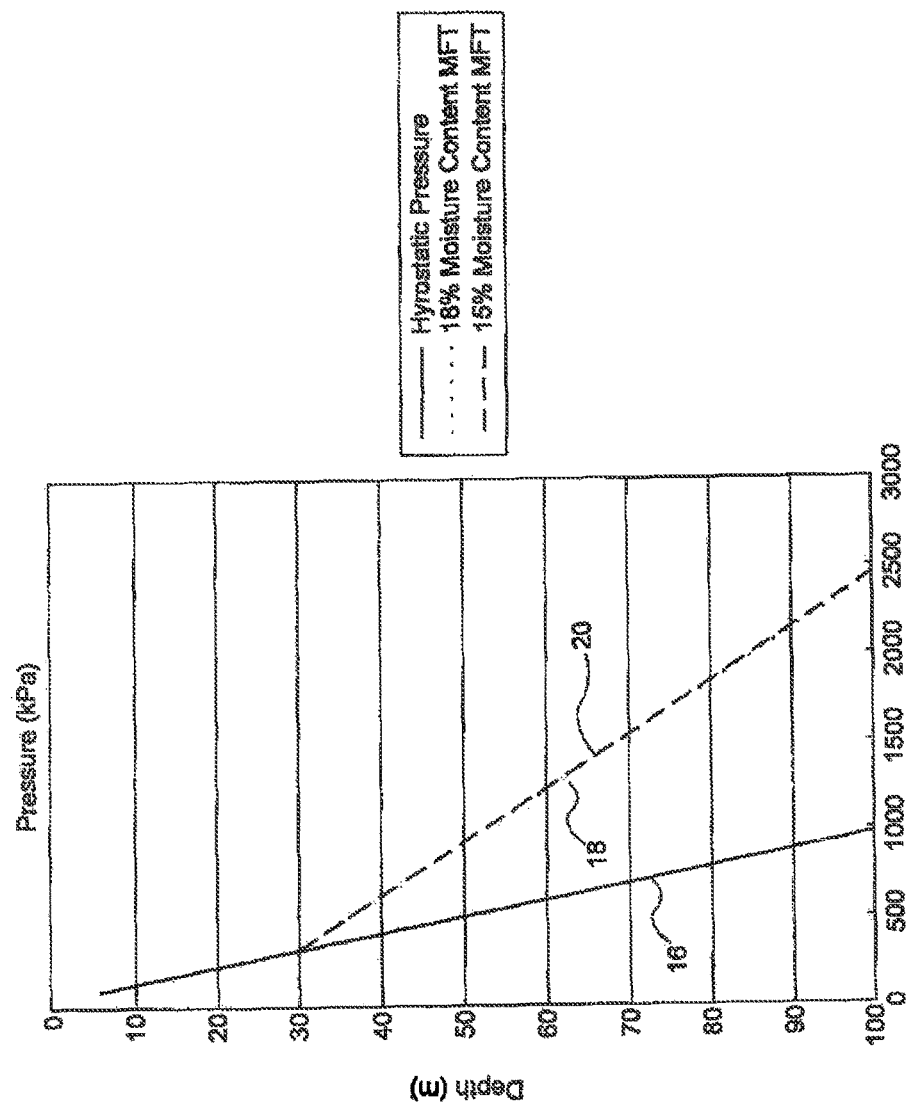

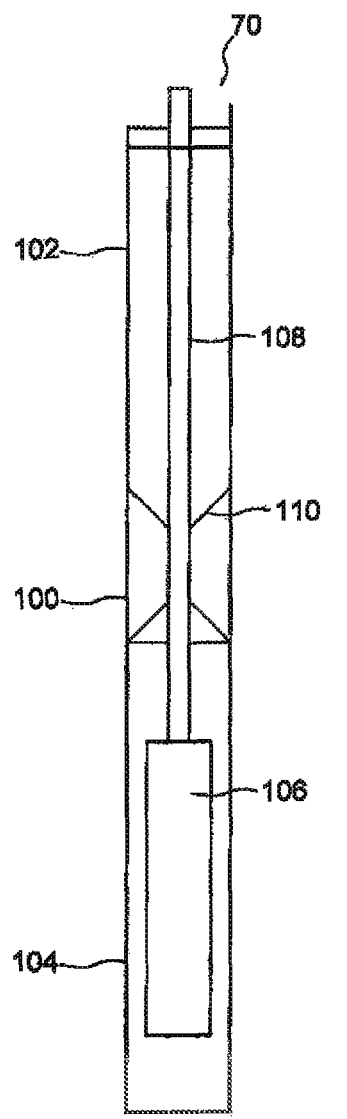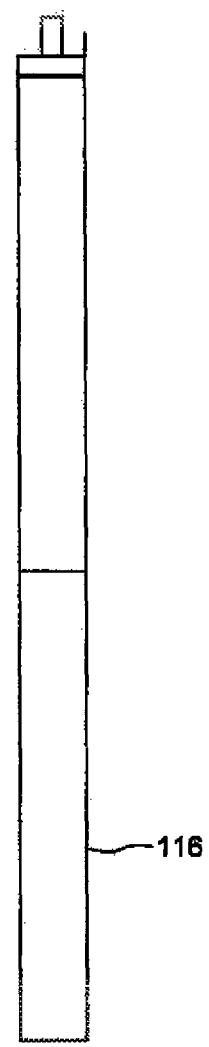
Figure 8
Figure 8a
Figure 9

ELECTROKINETIC PROCESS FOR CONSOLIDATION OF OIL SANDS TAILINGS

FIELD OF THE INVENTION

This invention relates generally to the broad field of pollution control. More particularly, this invention relates to methods and apparatus that can be used to mitigate the persistent nature of certain types of tailings ponds, such as tailings ponds filled with waste products from tar or oil sand recovery processes. Such mitigation allows land reclamation to occur.

BACKGROUND OF THE INVENTION

Oil or tar sands are a source of bitumen, which can be reformed into a synthetic crude or syncrude. At present a large amount of hydrocarbon is recovered through surface mining. To obtain syncrude, the hydrocarbons must be first separated from the sand base in which it is found. This sand based material includes sands, clays, silts, minerals and other materials. The most common separation first step used on surface mined tar sands is the hot water separation process which uses hot water to separate out the hydrocarbons. However, the separation is not perfect and a water based waste liquid is produced as a by-product which may include small amounts of hydrocarbon, heavy metals, and other waste materials, The oil producers currently deal with what they call Fresh Fine Tailings (FFT) and Mature Fine Tailings (MFT); the distinction between the two being that MFT are derived from FFT after allowing sand to settle out over a period of typically 3 years. MFT are mostly a stable colloidal mixture of water and clay, and other materials, and is collected in onsite reservoirs called tailings ponds.

Oil extraction has been carried out for many years on the vast reserves of oil that exists in Alberta, Canada. It is estimated that 750,000,000 m³ of MFT have been produced. Some estimates show that 550 km² of land has been disturbed by surface mining yet less than 1% of this area has been certified as reclaimed.

The FFT and MFT present three environmental and economic issues: water management, sterilization of potentially productive ore, and delays in reclamation. Although concentrations vary, MFT/FFT can typically comprise 50 to 70% water. This high water content forms, in combination with the naturally occurring clays, a thixotropic liquid. This liquid is quite stable and persistent and has been historically collected in large holding ponds. Very little has been done to treat the MFT that has been created and so it continues to build up in ever larger holding ponds. As development of the tar sands accelerates and more and more production is brought on line, more and more MFT/FFT will be produced. What is desired is a way to deal with the MFT/FFT that has been and will be generated to permit land reclamation, release of captured water and provide access to the productive ore located beneath such ponds.

MFT/FFT represents a mixture of clays (illite, and mainly kaolinite), water and residual bitumen resulting from the processing of oil sands. In some cases MFT may also be undergoing intrinsic biodegradation. The biodegradation process creates a frothy mixture, further compounding the difficulty in consolidating this material. It is estimated that between 40 and 200 years are required for these clays to sufficiently consolidate to allow for reclamation of tailings ponds. Such delays will result in unacceptably large volumes of MFT, and protracted periods of time before reclamation certification can take place unless a way to effect disposal and reclamation is found. The oil sands producers are required by a directive of the Energy Resources Conversation Board to treat their tailings to a bearing capacity of 5 kPa by 2012 and 10 kPa by 2015.

Applied electrical fields have been used to dewater soils for construction projects to improve bearing capacity. Electrophoresis has been used in many industries, such as the pharmaceutical industry and ceramics industry to produce high grade separations. Electrostriction has been used to create high density ceramics. In electrical resistance heating treatment at Fargo, N. Dak. (Smith et al., 2006)[a], electrostrictive phenomenon has been observed in the application of an electric field to already consolidated clays where the applied electric field ranged between 0.46 to 0.8 volt/cm. Examples of applications of electrical fields in various circumstances can be found in the following prior patents.

U.S. Pat. No. 3,962,069
U.S. Pat. No. 4,107,026
U.S. Pat. No. 4,110,189
U.S. Pat. No. 4,170,529
U.S. Pat. No. 4,282,103
U.S. Pat. No. 4,501,648
U.S. Pat. No. 4,960,524
U.S. Pat. No. 5,171,409
U.S. Pat. No. 6,596,142

[a] Smith, G. J., J. von Hatten, and C. Thomas (2006) *Monitoring Soil Consolidation during Electrical Resistivity Heating, Proceeding of the Conference on Remediation of Chlorinated and Recalcitrant Compounds*, May 22-25, 2006, Monterey, Calif., The application of electrical current to oil sands tailings has also been tried, as shown in U.S. Pat. No. 4,501,648. However, this teaches a small device with a tracked moving immersed electrode onto which is deposited clay solids. The electrode is moved out of contact with the liquid and then the solids are scraped off the electrode. A chemical pre-treatment step is required to achieve the desired deposition rate on the immersed electrode. While interesting, this invention is too small to be practical for MFT/FFT treatment and requires a chemical pre-treatment step which adds to the cost.

Moreover, the application of electrical fields to treat small-scale clay deposits may not require efficient use of energy. However, on a large scale, the application of an electrical current requiring high power consumption or requiring an application of an electrical current over a long period of time may be prohibitively expensive or impossible to carry out due to the available resources. At remote sites, large-scale access to electrical power may be limited. Small variations in electrical current draws may have significant impact on costs and power requirements when dealing with millions of square meters of MFT and FFT. What is desired is a better way to deal with vast volumes of MFT/FFT that will need to be treated. There is a need for a practical system for dealing with tailings efficiently and quickly.

SUMMARY OF THE INVENTION

According to the present invention, the consolidation of solids present in MFT/FFT may occur in multiple phases that can be initiated contemporaneously or sequentially under the application of an electrical field. These phases can be controlled by varying the applied voltage gradient to achieve a desired end point. For example, if water release and natural consolidation is desired, then one can apply a voltage gradient that promotes electro-osmotic flow of low pH water from the anode to neutralize the water sorbtion capability of the clay solids in the MFT/FFT. Or if one desires material that meets a desired bearing capacity, the electro-osmotic flow described above would occur with or be followed by an increase in the voltage gradient which facilitates the application of an electrostrictive force as the electrical resistance increases. Also envisaged is the ability to take the treated MFT/FFT at various stages of its consolidation, place in a mould, dry either in air or in a kiln to create building materials. The phases may occur in distinctly separate steps, for example, at different locations. Some phases may be replaced by other steps or processes, or omitted entirely, depending on the particular needs for each application.

Further electro-kinetic processes offer a means to release water from the MFT/FFT through electrolysis, which creates low pH water at the anode, which combined with electro-osmosis causes the migration of this low pH water to the cathode, lowering the pore water pH to the point of zero charge (P) which in turn releases the pore water bound in the diffuse double layer of the clay structure.

These phases include the initial water release under the influence of an electric field in a flocculation step with an accompanying release of water, followed or contemporaneously occurring with the secondary release of pore water during the electro-osmotic flow of low pH water produced at the anode which when electro-osmotically transported through the MFT/FFT neutralizes the diffuse double layer. This results in the release of ions from the pores which are transported to the anode and cathode via electrophoresis, electromigration and electro-osmosis. With the ions released and transported to the anode and cathode, the electrical resistance of the wet tailings increases, which allows the application of higher voltage gradients at lower current draw, or improved energy efficiency to achieve compaction through electrostriction. As a result, in one embodiment, the electrokinetic remediation process involves two distinct and separate steps involving the water release/ion release/flocculation, followed by compaction through electrostriction as the electrical resistance increases. The draining of water from the tailings also increases the electrical resistance and provides a means of controlling the process.

MFT/FFT, in its original state being a thixotropic liquid cannot support a load, and given that the liquid is stored in large ponds, there is virtually no ability to release pore water pressure by conventional means, such as compressive loading. Therefore, the present invention provides for a reduction of the moisture content of the solids such that it is no longer a thixotropic liquid, preferably by the application of an electrical field to induce flocculation, releasing pore water and pore water pressure and then to compress the MFT/FFT to express further pore water from the solids to increase the density further increasing the lithostatic loading. In one aspect of the present invention a mechanism is provided for relief of pore pressure to accelerate the consolidation of the solids for say, the consolidation of thick deposits.

The present invention provides the placing of equipment in-situ in tailings ponds or ex-situ, for example, in designed treatment cells, to allow induction of an electrical field (AC, DC, or EM-induced) having a voltage gradient that can be varied resulting in electrokinetic floccing of the MFT/FFT, electro-osmotic flow of low pH water, electrophoretic flow of ions, and an electrostrictive force causing the flocculated or weakly consolidated solids to further consolidate. An electrostrictive force can be varied by either the duration of application and/or the magnitude of the voltage gradient to achieve a desired bearing capacity of the MFT/FFT. An appropriate magnetic force can also be applied to accomplish the same goals and is comprehended by the present invention although the electrical field is most preferred.

According to an aspect of the present invention, the electrical field and the low pH water neutralizes the electrostatic charges on the clay platelets, releasing water from the MFT/FFT pores during an initial flocculation step. Over time the flocculated solids will settle into a weakly consolidated mass. The electrical field also creates electro-osmotic flow to the cathodes, where water can then be pumped away to a location where it can be optionally treated and recycled. Under the application of an electric field, electrophoresis results in the migration of ions to the anode and cathode, thus increasing the electrical resistance of the tailings. The water removal and increase in electrical resistance can also assist further consolidation along with the electrostriction. The electrostrictive force can be applied in varying degrees to achieve the desired bearing capacity in desired zones of the MFT/FFT deposits or, to simply achieve a consolidation level sufficient to permit effective use of sand drains, wicks and the like to complete the consolidation process. The latter option allows for consolidation in active tailings ponds that are not seeking certified reclamation, but where for instance, greater storage capacity is desired. In one embodiment, the tailings may be left to consolidate in tailings ponds or other settling locations to allow for natural compaction of the tailings over time.

Therefore, there is provided, according to the present invention, a method of treating liquid tailings using electrokinetics, the method comprising the steps of:
 a. Causing at least two electrodes to come into contact with the tailings;
 b. Inducing flocculation of particles in the tailings and releasing water from the tailings by establishing an electrical field between said at least two electrodes, the electrodes being connected to a source of electrical power having a variable voltage to create at least one cathode and at least one anode; and
 c. Compacting said flocculation solids and removing further water released from said compacting solids to create a compacted material having a minimum desired load bearing capacity.

In a further embodiment of the present invention, the electrical field applied during the electro-kinetic treatment can be varied at different depths. For example, by applying the electrical field to the deepest depths of the MFT/FFT deposits causes the clay particles to flocculate there first. Afterwards, the conductive zone of the electrodes which creates the electric field can be raised to higher elevations to encourage weak consolidation at a different depth. Alternatively, for especially thick MFT/FFT deposits, the operator may wish to induce flocculation in the deeper deposits of MFT/FFT, and then electrostrictively treat a shallow zone in an amount sufficient to achieve a 5 kPa or greater bearing capacity. This area could then be recovered with overburden to enhance the consolidation of the non-electrostriction treated depths through the use of sand drains or wicks or the like, while re-vegetation can occur on the replaced overburden.

In a still further aspect of the present invention the flocculation step and the subsequent consolidation step both involve the release of water from the thixotropic liquid. If this free water is removed from the tailings pond for further processing and clean-up, that frees up space in the pond for additional MFT to be added. As a result the present invention provides for a way to increase the capacity of the tailings pond to accept more MFT/FFT, by the separation and removal of water content from the MFT/FFT.

In a further embodiment of the present invention, controlled compaction of MFT/FFT occurs at a location having semi-permanent treatment cells capable of receiving MFT/FFT. Treatment of the MFT/FFT may occur in a series of batch treatments, for example, on a continuous year-round basis.

BRIEF DESCRIPTION OF THE DRAWING

Reference will now be made to preferred embodiments of the invention, by way of example only, with reference to the following figures in which:

FIG. 1a is a graph depicting an estimation of pressure at depth for a sample tailings pond;

FIG. 1b is a graph depicting an estimate of lithostatic pressures resulting from an electrostriction treatment according to the present invention at various depths;

FIG. 8 is a schematic of a first embodiment of a combined cathode well structure;

FIG. 8a is a top view of the embodiment shown in FIG. 8;

FIG. 9 is a schematic of a second embodiment of a combined cathode well structure;

DETAILED DESCRIPTION OF THE PREFERRED EMBODIMENTS

Figure 2:
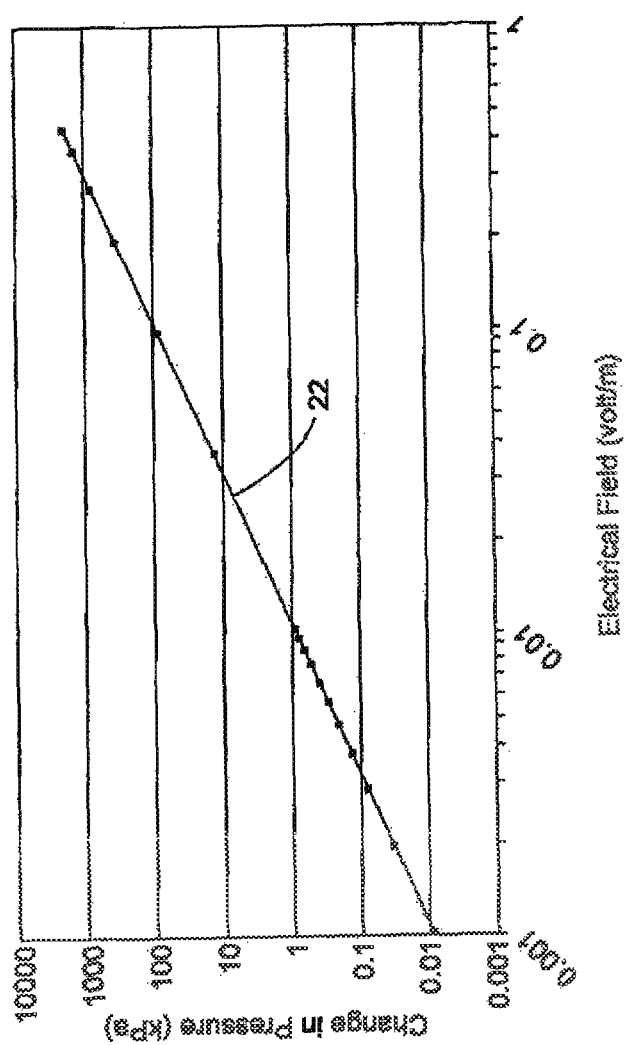
FIG. 2 is a depiction of a graph showing a change in pressure with electrical field variance according to the present invention.

In this specification the terms MFT, or MFT/FFT or FFT shall mean the tailings that exist in tailings ponds that arise from the extraction of hydrocarbons, such as bitumen, from tar or oil sands, or fly ash tailings ponds. As will be appreciated by those skilled in the art, the exact composition of MFT/FFT will vary, depending upon the composition of the ore being mined due to local variations in such ore. However, as used herein the term is intended to include compositions of material that include water, clays, silts, and residual hydrocarbons and hydrocarbon by-products among other things.

The application of an electrical field to a dielectric material results in certain electro-kinetic phenomena, including electro-osmosis, the movement of water from an anode to a cathode; electrophoresis, the movement of ions in the water to oppositely charged electrodes, and electrostriction, a result of the application of an electrical field that results in mechanical work which deforms the dielectric material.

The present invention comprehends the application of an electromagnetic field and most preferably an electrical field to the WT. In one embodiment of the present invention, there are two aspects: the first being the application of an electric field to neutralize the diffuse double layer that is formed between the clay particles and the water, further neutralization as a result of the electrolytic breakdown of water under the application of an electric field, whereby acidic conditions are produced at the anode and basic conditions are created at the cathode, whereby the acidic water migrates from the anode under electro-osmotic flow to reduce the pH in the wet tailings to the point of zero charge of the tailings minerals, releasing water and ions from the tailings minerals, and electrophoretic transport of the released ions from the tailings mineral surfaces. The second aspect occurs where a second electric field is applied such that an electric field can be used to exert a force on the solids present in the MFT/FFT due to electrostriction. The second electric field to induce electrostriction may be created by the same source as the first electric field mentioned above, or may be created by a separate source. Electrostriction[b] occurs where dielectric materials are subjected to an electric field. When an electric field is applied to a dielectric material such as clay particles, the opposite sides of the domains become differently charged and attract each other, reducing material thickness in the direction of the applied field, and simultaneously increasing thickness in orthogonal directions due to Poisson's ratio[c]. The resulting strain (ratio of deformation to the original dimension) is proportional to the square of the polarization (i.e., the voltage gradient). Reversal of the electric field (e.g., under the application of alternating current) does not reverse the direction of the deformation. Therefore, the same phenomenon is observed under a magnetic field, DC or AC currents, and under electro-magnetically-induced current flow, again, either alternating or direct all of which are comprehended by the present invention.

[b] A phenomenon first reported by Reuss in 1807 to the Moscow Academy of Science

[c] When a material is compressed in one direction, it usually tends to expand in the other two directions perpendicular to the direction of compression. This phenomenon is called the "Poisson effect". Poisson's ratio ν is a measure of the Poisson effect.

The electric force density under an applied electrical field to induce electrostriction is governed by the square of the electrical gradient. From Brevik (1982)[d], to determine the electric force density $f^{el}$, one can make use of the Helmholtz variational principle under reversible, isothermal conditions. From this, $f^{el}$ is defined as:

$$f^{el} = -\frac{1}{2}E^2 \nabla \varepsilon + \frac{1}{2}\nabla\left[E^2 \rho \left(\frac{\partial \varepsilon}{\partial \rho}\right)_T\right]$$

Where:
$\nabla$ refers to the vector in the direction of the application of the field
$\rho$=mass density (kg·m$^{-3}$);
$\varepsilon$=permittivity (s$^4$·A$^2$·m$^{-2}$·kg$^{-1}$);
E=electric gradient (volt·m$^{-1}$); and the system is operating at constant temperature.

[d] Brevik, I. (1982). Fluids in electric and magnetic fields: Pressure variation and stability. Canadian J. Physics, 60, pp 449-455.

The second term in this equation is the electrostriction term.

According to the present invention the application of a preferred electrical field results in flocculation of the clay particles by said electric field, with pH neutralization of the sorbtive capability of the clay as a result of the electro-osmotic flow of low pH water from the anode. This releases water that was otherwise bound to the clay particles to form the persistent gel or thixotropic MFT/FFT liquid. Once flocculation has occurred, the present invention provides for further water release and consolidation of the clay solids as explained in more detail below.

In one aspect of the present invention the further consolidation of the solids occurs through electrostriction. To determine the electric field required to achieve a given amount of consolidation, the change in permittivity relative to the change in mass density under a defined electric gradient (E, volt/m) is determined. Therefore, the present invention provides that it is possible to correlate changes in the permittivity and as a result density under an applied electrical field to track the progress of the electrostriction treatment of the MFT/FFT.

According Melloni, et al., (1998)[e], the change in density under an applied electric field can be determined from:

$$\Delta \rho = \frac{1}{2} \rho C \gamma_e \varepsilon_0 |E|^2$$

Where:
Δρ=the change in density under the applied electrical field (kg·m$^{-3}$)
ρ=the density of clay (kg·m$^{-3}$)
C=the compressibility of clay (%)
$\gamma_e$=electrostriction coefficient (unit-less)
$\varepsilon_0$=dielectric constant (permittivity; unit-less) for clay
E=electric field (volts·m$^{-1}$)

[e] Melloni, A., M. Frasca, A. Garavagiai, A. Tonini and M. Martinelli (1998). *Direct Measurement of Electrostriction in Optical Fibers. Optics Letters*, Vol. 23, No. 9. p 691-693.

The electrostriction coefficient used was 0.902 (Melloni, 1998). One known dielectric constant for kaolinite is 5.3±0.6 (Ishida, et al., 2000[f]). The permittivity of water is 80.37[g]. Therefore, for MFT/FFT which comprises 50% to 70% water content, the estimated permittivity for MFT/FFT is expected to range between 43.1 and 58.7. MFT/FFT are reported to typically have between 50% and 70% water (by weight) but this is an estimated range only and the present invention can be applied to materials having either higher or lower water contents without departing from the scope of the invention. In laboratory testing, moisture contents of the treated MFT ranged from 15.6% to 72.7%, with associated bearing capacities ranging from 19,700 kPa to 33.9 kPa. Therefore reduction in moisture content may not be a good indicator of bearing capacity.

[f] Ishida, T., M. Tomoyuki, and C. Wang (2000) *Dielectric Relaxation Spectroscopy of Kaolinite, Montmorillonite, Allophone and Imogolite under Moist Conditions. Clays and Clay Minerals*, Vol. 48, No. 1, 75-84.

[g] Weast, Robert, C. (ed; 1975). *Handbook of Chemistry and Physics.* 56th Edition, CRC Press, Cleveland, Ohio.

Bearing capacities are dependent on compaction effort, which is governed by the applied force and the duration of the application of the desired force. Either parameter can be varied to achieve the desired bearing capacity. This is expected to vary as to the mineralogy of the MFT/FFT and the pore water chemistry varies as a result of variations in the ore from one location to the next.

The following relationship equates the applied electrical field to the electrostriction force in kPa:

$$\Delta p = 1/2 E^2 \rho \left( \frac{(\varepsilon - \varepsilon_0)^2}{6 \varepsilon_0} \right)$$

From the above relationship to achieve these forces, the applied electric field is estimated to range from 1 volt/cm to 4 volt/cm (within the linear range of the equations describing electrostriction). From the above equation, this translates into an electrostriction pressure of between 1.23 and 19.7 kPa, which can be varied by the applied gradient or time of treatment to achieve the desired compaction effort for the desired bearing capacity.

The greater the applied electric field, the greater the applied force, the shorter the time period to achieve the desired degree of compaction, or the greater the degree of compaction that can be achieved. However, this may also result in the greater the amount of energy consumed, relating directly to cost. Further, water balance is important. The higher the applied electric field the greater the potential for increases in temperature and hence drying of the MFT/FFT. Drying MFT/FFT results in loss of electrical circuit and hence the electro kinetic treatment. It will be now understood by those skilled in the art that the present invention can be applied in various intensities, depending upon a balance of cost, timing and degree of compaction required. The design of the delivery system and equipment for the electrical energy can be based on the balance required between speed, cost and result required in the tailings pond being reclaimed or ex-situ treatment cells. For example, the present invention provides that a step down transformer may be used to convert line voltages to distribute power to a network of electrodes fully penetrating the MFT/FFT to induce an electrical field resulting in a force within an appropriate range.

Turning now to the figures, FIG. 1a depicts in schematic form the pressure-depth relationship in a notional tailings pond filled with MFT or FFT. In FIG. 1a the x axis is pressure and the y axis is depth. The line 10 is hydrostatic pressure, the line 12 is the pressure at 70% water content MFT and line 14 is the pressure at 50% water content MFT. As can be seen all of the lines are straight meaning that the pressure varies linearly with depth (assuming water is a non-compressible fluid at a constant temperature and there is negligible densification of the MFT). FIG. 1b is a schematic of the pressure distribution with depth after an electro-kinetic treatment according to the present invention, where there is a 30% reduction in MFT volume as a result of the electro-kinetic treatment of the present invention. In FIG. 1b, because the clay in the MFT has been flocced according to the present invention, the MFT is now denser and there has been a gravity-separation of the water from the flocked particles within the MFT. In FIG. 1b the line 16 is the hydrostatic pressure and the lines 18 and 20 represent the pressures at depth for reduced water content solids, such as solids having 15% water content in line 18 and 18% water content in line 20. These water contents are expressed as a percentage of the total weight.

As can now be appreciated the pressure profile of FIG. 1b results in greater lithostatic pressure with depth than is shown in 1a. Therefore, in one embodiment, the present invention provides a step-wise advance in consolidating the solids within the MFT, with these steps providing options as the treatment progresses. The invention involves a process and apparatus to create and apply an electrical (or magnetic) field with a voltage gradient that can be varied and is maintained over a treatment period, and then providing for release of pore water to increase the density of the material (FIGS. 1a, and 1b) while the material consolidates.

In one aspect of the present invention, the method of treating liquid tailings is applied in situ at a tailings pond in which there are two main steps. The first part is to place the necessary equipment in position to deliver the desired electrical field to the MFT. This is explained in more detail below. The second aspect is to identify what happens to the MFT once the electrical field is applied in a treatment process according to the present invention. The first result of the application of the electrical field according to the present treatment process is that the MFT will begin to flocculate and water is released through this flocculation process as a result of the electrical field and through electro-osmotic flow of low pH water. After this has occurred, the operator has the option to continue with electrostriction (described below) or allow the MFT to consolidate assisted by such techniques as sand drain, wick drains, etc. This may be useful to the operator where the tailings pond is in operation and he wishes to increase capacity to accept additional tailings. This feature of drain-assisted consolidation further enhances and takes advantage of natural consolidation started by the application of an electrical field.

As noted above, after the flocculation step the further application of the electrical field allows for further application of electro-osmotic flow of low pH water to lower the clay point of zero charge to neutralize the sorbtive characteristics and the application of an electrostriction force, which is converted to mechanical work. The relationship between the applied voltage gradient and the electromotive force is linear in the range between 100 to 400 volts/m and depicted in FIG. 2. FIG. 2 shows a schematic relationship between a change in the applied electrical field and the pressure. In this graph the change in pressure is plotted along the y axis and the change in electrical field is plotted on the x axis. As can be seen from the plot line 22, the greater the electrical field the greater the pressure. Of course there is a limit of how much electrical energy can be applied and the cost associated with applying a higher than necessary electrical field.

The higher the voltage gradient, the greater the electromotive force, and as a result, the shorter the treatment time. However, there are three negative factors in applying a higher gradient: 1) the current density around the electrodes increases, resulting in "dry-out" and loss of electrical contact with the pore water carrying the current; 2) the greater the gradient, the closer electrode spacing, and increased apparatus costs; and 3) The electrical resistance of the MFT and FFT increases as water is released, making the timing of the application of higher electrical fields important. The voltage gradients and number and spacing of electrodes need to be evaluated on a case-by-case basis to determine the most economical design compared against the timeframe for treatment.

Figure 3:
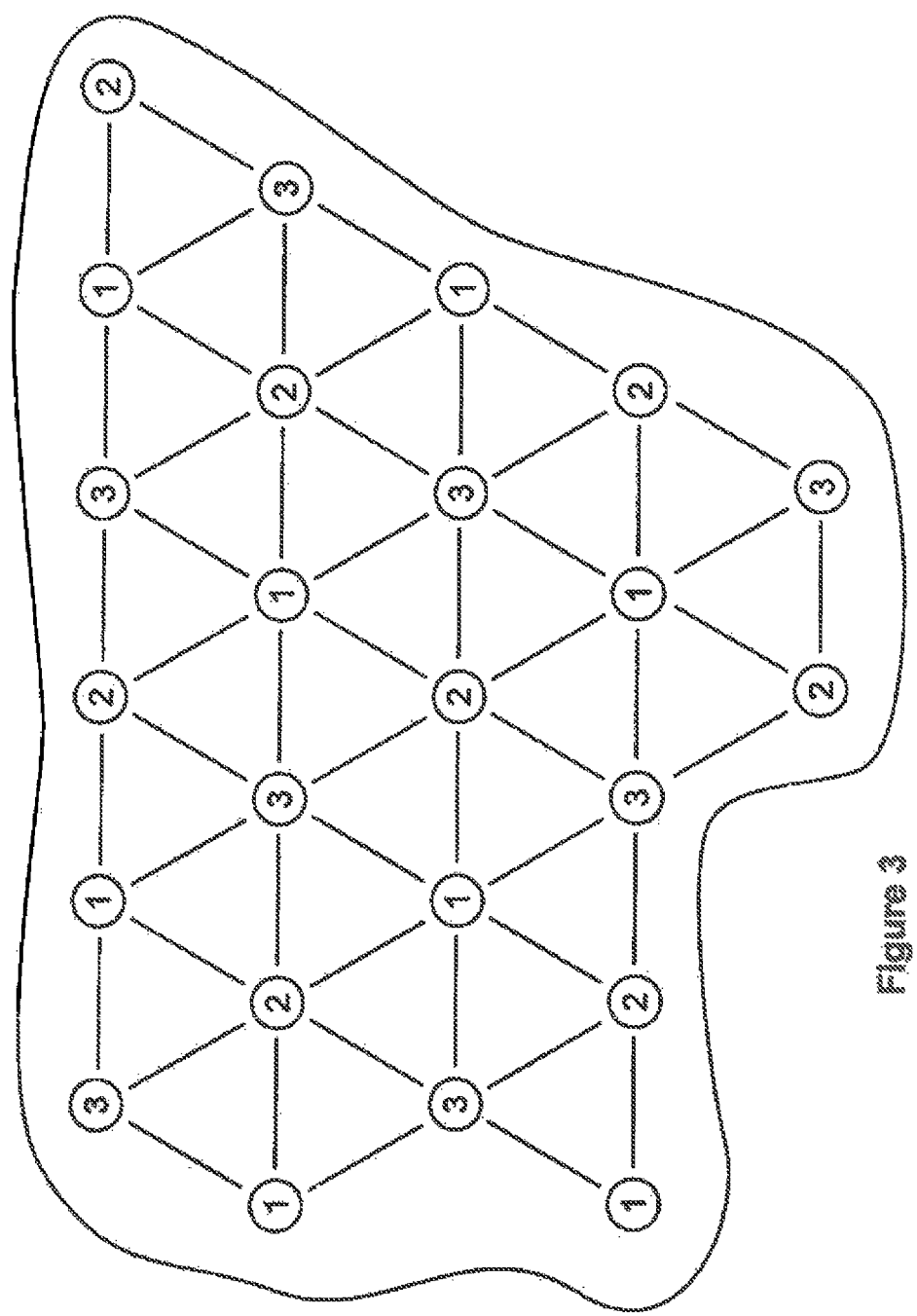
FIG. 3 is a layout of electrodes in a three spot treatment pattern according to the present invention.
Figure 4:
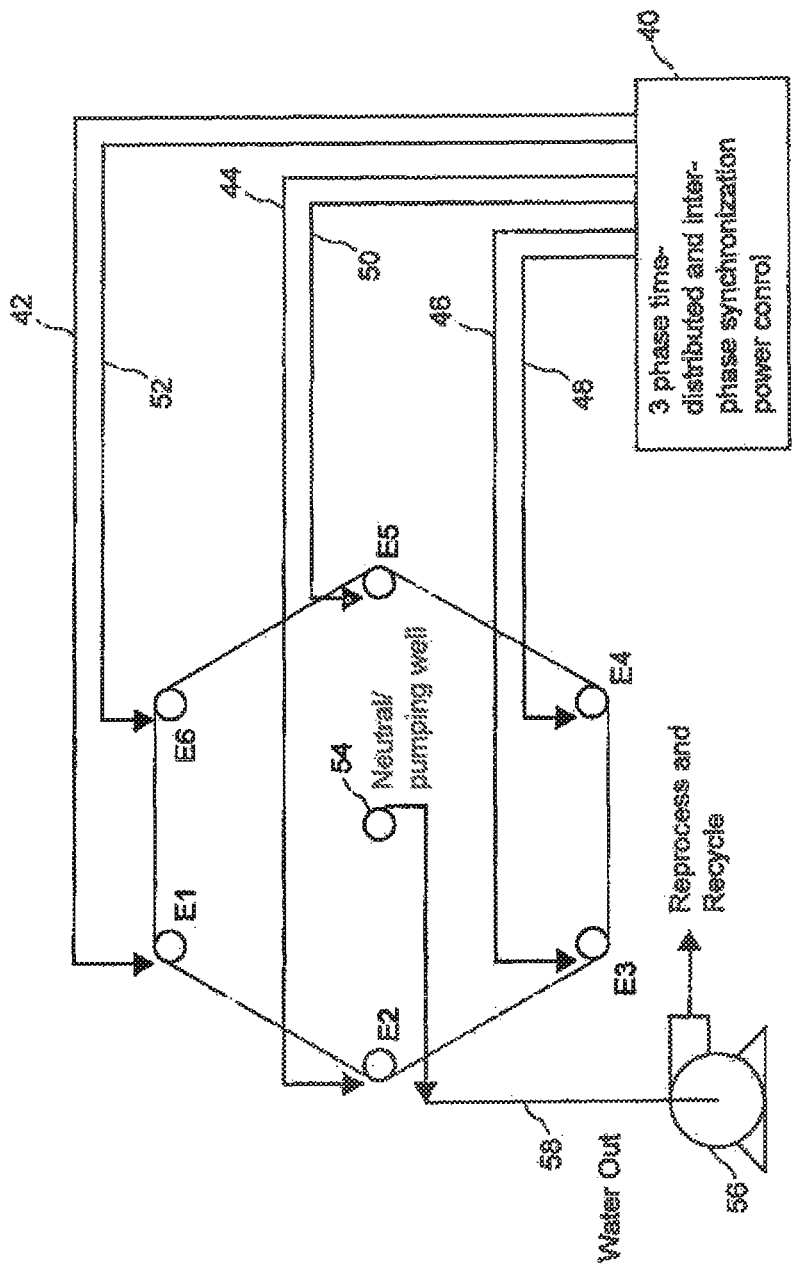
FIG. 4 is a schematic of a further electrode layout with a neutral pumping well according to a further aspect of the present invention.

One apparatus used to effect the action of the present invention on MFT/FFT is described below. One embodiment of this invention involves the use of a variable voltage power supply connected to a network of electrodes. Where the power source is an AC source, the electrodes are arranged in a triangular (FIG. 3) or hexagonal pattern (FIG. 4). In FIG. 3 there are three electrodes denoted with the numbers 1, 2, or 3. These electrodes would be charged out of phase with one another, with the phase charge varying with time. According to the present invention, the spacing between electrodes and the desire voltage gradient is determined through the conductivity of the pore water in the thixotropic liquid, the desired degree of consolidation and time to achieve, the volume and geometry of the treatment volume, and the capability of the power supply.

FIG. 4 shows an embodiment of an apparatus for applying an electrical field to induce a voltage gradient across the area to be treated, or subsections of the area to be treated. There are six electrodes shown as E1 to E6 respectively in a regular hexagonal pattern. A source of AC power 40, is shown and connected by electrical conductors 42, 44, 46, 48, 50 and 52 to each electrode in turn. As will be understood by those skilled in the art, each of the electrodes E1 through E6 will be charged at 60 degrees out of phase with the adjacent electrode, with the phased charging varying with time. This results in a maximum electrical field being generated across the long diagonals of the hexagon (e.g. E1 to E4), where the electrodes are 180 degrees out of phase (Note: Electrodes E2 to E5 are also 180 degrees out of phase, as are electrodes E3 to E6, and so on). The electrical field will be preferably initiated at less than 200 V/m, increasing as the water and ions are released resulting in increased electrical resistance, allowing for greater voltage gradients to be applied more efficiently, across the longest diagonals to efficiently apply electrostriction. This phased charging is also charged sequentially with time to ensure even application of the electrical field, thus the hexagonal pattern noted provides for a useful pattern for applying the desired electrical field across a substantial area for an AC power source 40.

The AC power source 40 will be provided with a power controller to permit the voltages being applied to be varied. Most preferably it provides a six phase for the hexagonal geometry and a three phase time distributed and interphase synchronization power control for the three phase geometry. While the present description is with respect to an AC power source, the present invention comprehends the use of a direct current, or electro-magnetically induced current using a variable voltage transformer as well. The voltages applied are to be determined based on the most economic use of electrodes (number and spacing) the capabilities of the power supply, but the hexagonal pattern is believed to provide good results (for illustration of an AC application where the volume of MFT to be treated has simple geometry approximating a cylinder); and, the timing of the water release from the MFT/FFT and the subsequent increase in electrical resistance. The desired voltage supplied by the transformer is dependent on the spacing of the electrodes, and the conductivity of the interstitial water in the MFT/FFT, which will vary during the treatment as electrophoresis and electro-migration causes the movement of ions in the pore water. Therefore, the present invention provides that the voltage applied may be adjusted throughout the treatment period to respond to changes in the electrical field resulting from changes in the electrical properties of the MFT/FFT as the treatment progresses. The present invention contemplates that the transformer will be kept in a safe locked housing and operatively connected to a portable computer with remote access communication features, such as for example through a cellular network communications grid. This combination permits remote monitoring and access to operate the system.

According to a further aspect of the present invention, the electrical field generating equipment will include the capability of monitoring the electrical conductivity of the pore water and voltage drops, both overall and throughout the treatment area. Overall, the electrical conductivity will be monitored through variations in current draw at the transformers. Throughout the treatment area, periodic conductivity measurements through such means as small diameter slotted CPVC tubing embedded in the MFT/FFT will permit the operator to track and optimize the application of the electrical field.

Also shown is a neutral electrode 54 located at the center of the hexagonal spacing of the electrodes. According to one embodiment of the invention this electrode can also function as a water recovery device. In this case a pump 56 is used to draw the water out of the hexagon, through a conduit 58. This water is the water that is freed from the MFT/FFT by the flocculation step, the electro-osmotic flow of low pH water, and the electrostrictive compaction of the MFT/FFT and reduction in pore volume outlined above. The reclaimed water can then be optionally treated and recycled as desired using conventional processes.

According to one aspect of the present invention, these electrodes E1 to E6 can be constructed using steel pipe, steel rods, sheet metal pile, electrically conductive plates suspended on electrical cable or any other electrically conductive or electromagnetic material. For in situ treatment, the electrodes are placed in position by either through driving, drilling, using conventional drilling equipment, pile driving equipment, or in the case of treatment cells specifically constructed for this purpose, placed in accordance with the design placement with the MFT/FFT pumped into the treatment cell.

Figure 5A:
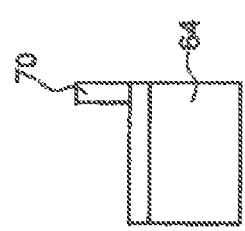
FIGS. 5a and 5b are enlarged views of a portion of FIG. 5.
Figure 5B:
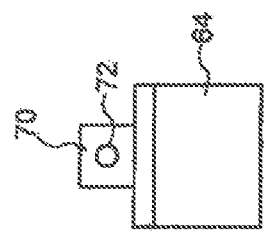
Figure 6:
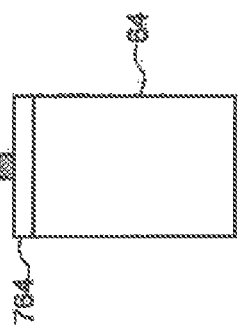
FIG. 6 is an enlarged view of an alternate connection.
Figure 5:
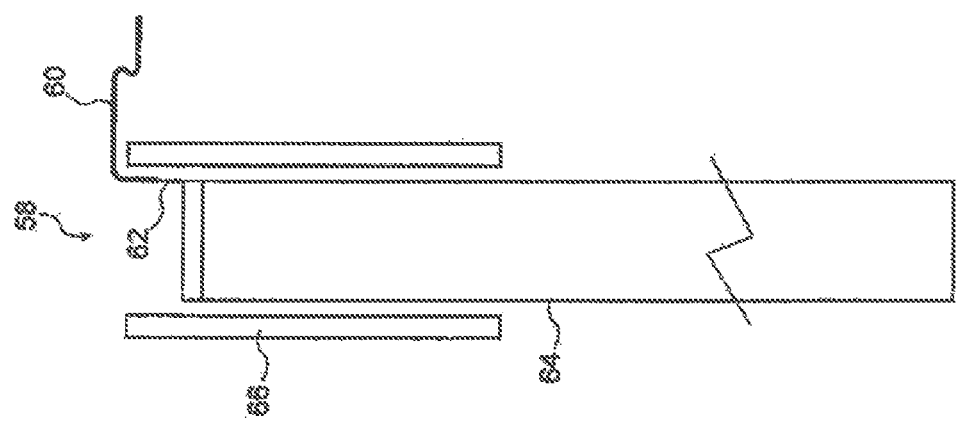
FIG. 5 is a tubular electrode connection according to the present invention.

FIG. 5 shows an electrode 58 according to one aspect of the present invention. The electrode includes an electrical connection wire 60 which connects to an electrode head connection 62. The electrode itself is in the form of hollow tube or pipe 64. Also shown is a non-electrically conductive sleeve 66 to protect against accidental electrical shocks to people or the like. The sleeve 66 can be of any reasonable length but is preferred to provide enough freeboard above the level of the tailings pond or treatment cell that the electrodes do not become totally submerged in the pond/cell. The depth of the bottom of the electrode 64, in some embodiments, may be driven nominally 3 m into native soil. The non-electrically conductive sleeve 66 may, in some embodiments, extended to a projected depth to which MFT will consolidate plus a safety factor of 10 m. In FIGS. 5a and 5b there is shown the details of the electrical head connection which can take the form of a welded flange 70 with a bolt hole 72 for electrical connection. In these figures the flange 70 is welded to the side of the pipe 64 and the pipe 64 has closed capped top. In an alternate embodiment of FIG. 6 the welded bolt connection 74 is placed centrally on a cap 76 which covers the open top of the pipe 64.

Figure 7:
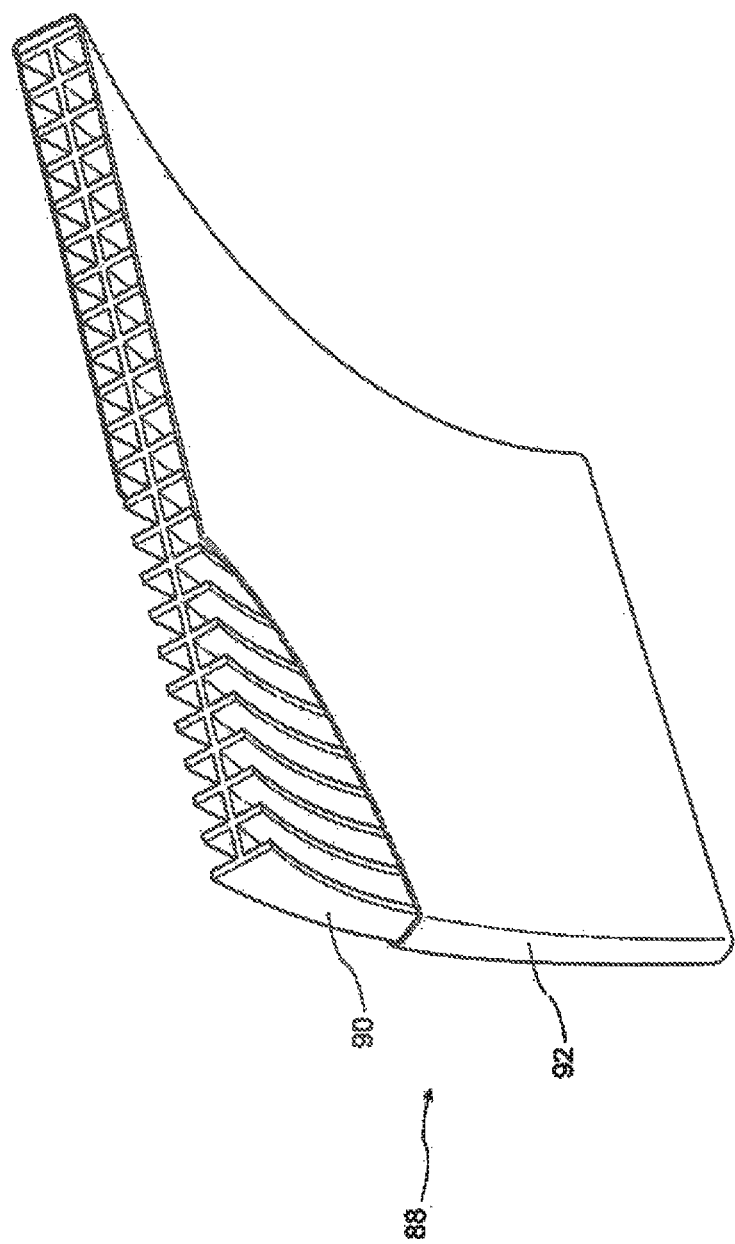
FIG. 7 is a schematic of a drain of the type that can be used in the present invention.

The present invention comprehends that it is usually desirable to remove supernatant water and or water being electro-osmotically drawn towards the cathode. In some cases it may be desirable to leave the water in place, above the flocculated solids, as a means to provide access to the treatment area by floating barge or the like. In most cases the removal of water to increase the electrical resistance of the MFT/FFT facilitates increasing the voltage gradient to increase the electrostrictive force as desired. As an option the present invention contemplates the use of a wick or drain to help remove additional pore water from consolidating solids within the pond. An example of such a drain 88 is depicted in FIG. 7, in which the hollow skeleton supports a water permeable mesh 92. Essentially this drain provides a leak path for pore water to be expressed through the consolidation process.

In a further embodiment the present invention provides as shown in FIG. 8 a dual purpose electrode and well. In this example, of a cathode, the cathode tubing 100 includes an upper section 102 and a lower section 104. The lower section is made water permeable, such as by being formed from a wire wound screen. A submersible pump 106 is located within the lower section 104 to pump the water collecting at the cathode out of the tubing 100 through a riser pipe 108. As noted the tubing 100 is provided with a centralizer 110 to keep the pump located within the middle of the tubing 100 and would electrically isolate the pump from the wall of the tubing 100. In FIG. 8a there is shown a top view of the cathode of FIG. 8 in which the top 112 is shown with the riser pipe 108, which is protected by an insulator 114. FIG. 9 shows an alternate embodiment in which the wire screen has been replaced with a perforated pipe section 116.

The present invention also comprehends being able to selectively treat sections of the tailings pond/treatment cell as local requirements demand. In the first instance the tailings ponds tend to be vast in area and to facilitate the treatment the present invention contemplates creating smaller treatment areas by means of sheet piling or the like, or by providing hydraulic control by manipulating the electro-osmotic flow to create pressure barriers around the treatment area. This can be used to divide the area of the pond up into smaller areas or cells to facilitate treatment. The sheet pile may also be used as an electrode in some cases. The use of the sheet pile wall is used to hydraulically and hydrologically isolate the treatment cell from the rest of the pond to also allow the supernatant water to be removed to the extent desirable prior to or during treatment within the treatment cell.

Figure 10:
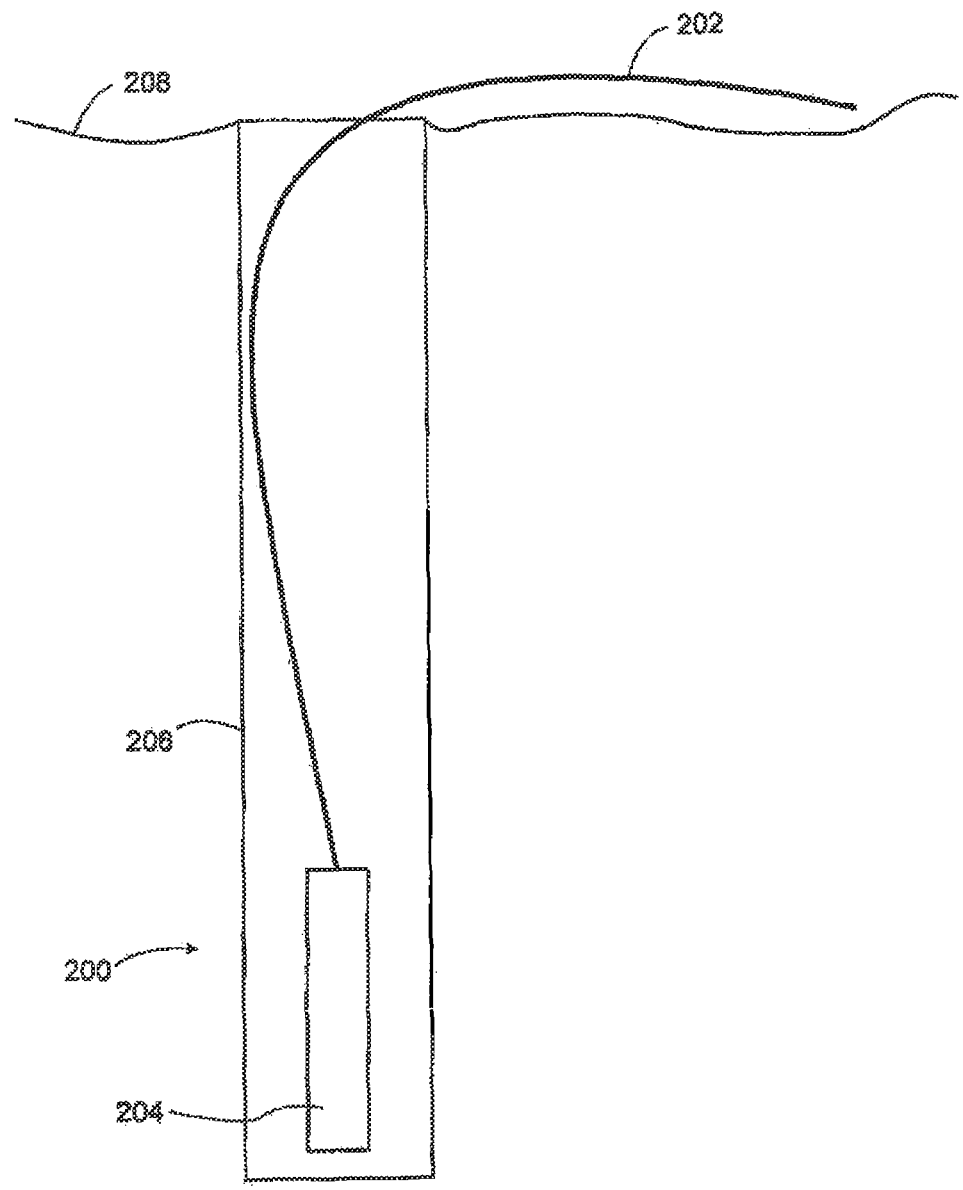
FIG. 10 is a schematic of a variable depth electrode according to a further aspect of the present invention.

In addition to dividing the pond into smaller areas for treatment through the use of cells, the present invention comprehends treating the pond at various depths to achieve certain desired results. FIG. 10 shows a cable electrode 200 which includes an electric cable 202 connected to a source of power and at the free end is an electrode 204. The electrode 204 can be an electrically conductive plate, bar, tube, or other electrically conductive element and can be made of any desired length depending upon the depth of the zone which is to be treated. Most preferable the cable electrode is inserted within a hollow tube 206 to which water can be added to maintain good electrical contact with the electrode 204, which is further maintained as the pore water is released during treatment. The MFT surface is denoted by reference character 208. As can now be appreciated the electrode 204 can be positioned at any depth within the tailings pond to permit the flocculation, water release and/or electrostriction to occur at such depth. The electrical cable 202 may be connected to a pulley system to raise or lower the cable 202 to a desired depth. The hollow tube 206 may be a driven borehole to ensure the walls of the hollow tube 206 do not collapse given the Thixotropic nature of MFT maintaining electrical contact.

Figure 11:
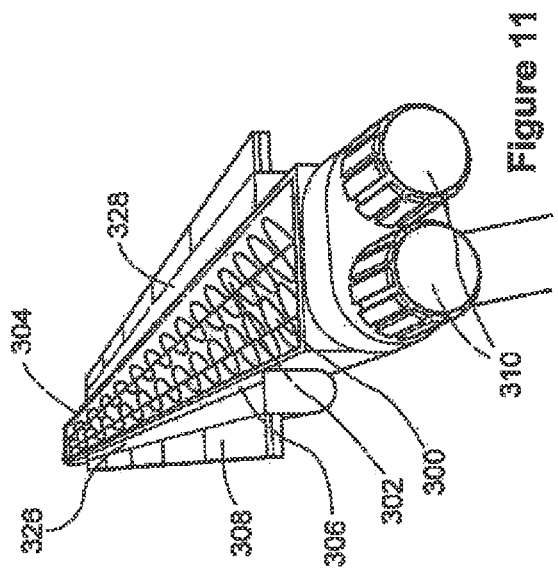
FIG. 11 is a perspective view of an embodiment of a conveyor having rotating electrode screws.
Figure 12:
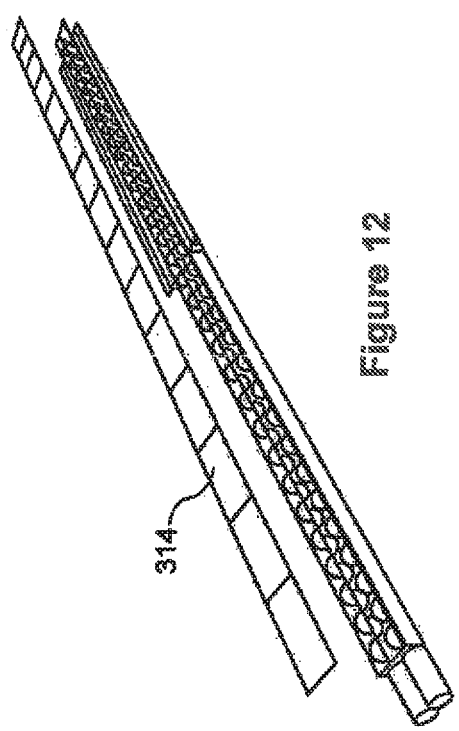
FIG. 12 is a partial perspective view of the conveyor in FIG. 11 having a removable insulated panel.
Figure 13:
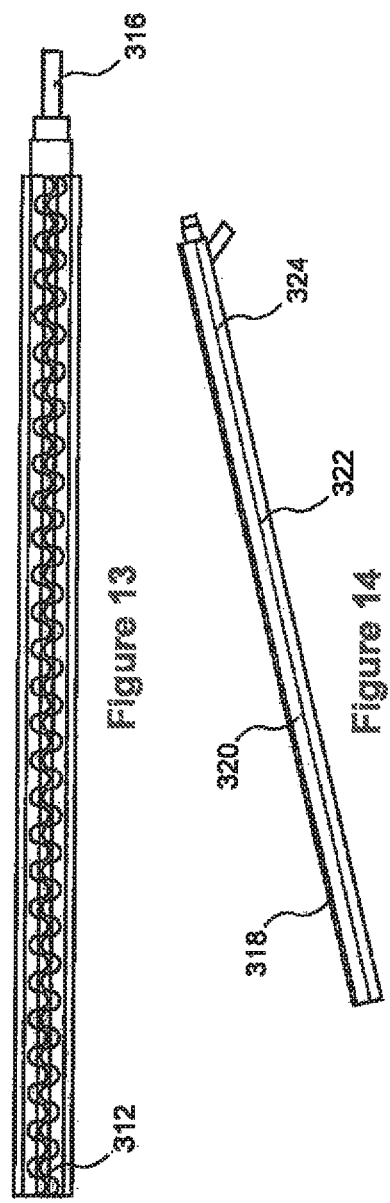
FIG. 13 is a top view of the conveyor in FIG. 11.
Figure 14:
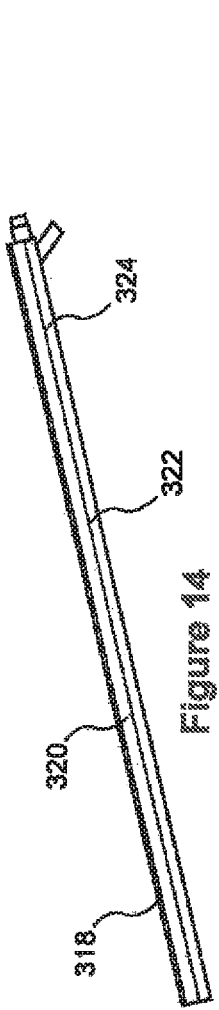
FIG. 14 is a perspective top view of the conveyor in FIG. 11.

A 100,000 bbl/day production facility produces 50,000 tonnes per day of FFT, which is equivalent to approximately 33,500 $m^3$ of FFT per day. The water release/ion release/flocculation step operates at a lower voltage gradient than the compaction step. One means of accomplishing this difference voltage gradient in a quasi-continuous operating mode is envisaged in FIGS. 11-14. A central canal (not shown) will feed wet tailings to a series of conveyors 300, 302. The conveyors 300, 302 are composed of two counter-rotating intermeshed electrode screws or augers, with one representing an anode and the other a cathode. These screw/electrodes 300, 302 will have the capability to reverse polarization, or be operated in an alternating current mode, with one operating 180° out of phase with the other, or other desired phasing. The conveyors 300, 302 lie within a conduit 304. As shown in FIG. 11, the conduit 304 is a canal. At the sides of the canal, serviceable dewatering screens 306 separate the main conduit 304 from a pair of troughs 326, 328. Service doors 308 are connected to the pair of troughs 326, 328. The conveyors 300, 302 are powered by electric motors 310. Removable insulated panels 314 (FIG. 12) may be used to cover the conduit 304. As shown in FIG. 13, an intake 312 lies on the upstream end of the canal 300 and a discharge 316 lies on the downstream end of the canal. As shown in FIG. 14, during the operation of the conveyor system, incoming tailings arrive through the intake 312 into the upstream end 318 of the conduit 304. As the tailings travel through the canal, flocculation begins to occur, as generally shown at 320. As the tailings continue through the canal, water is removed for treatment at the downstream end 322 of the canal. As shown in FIG. 11, the troughs 326 and 328 may lie on the downstream end 322 of the conduit 304 adjacent to the discharge. The troughs 326, 328 function as a water extraction outlet. Denser tailings 324 are discharged through the discharge 316 to the next treatment step. Further, the electrodes 300, 302 have a water-filled core, with screens to allow the low pH water generated at the anode to migrate to the cathode. A water extraction outlet may be connected directly to the hollow core of the cathode of the conveyors 300, 302 to allow for water removal. Any outlet allowing for the removal of water from the tailings reservoir may be used as a water extraction outlet. The spacing between the screw blades dictates the residence time needed to achieve the deflocculation.

The conveyors 300, 302 may be powered by any suitable means for causing rotation of the screws. In other embodiments, movement of the tailings through the conduit 304 may be caused by other means, such as a conveyor belt or a rotary pump, so long as the means cause the tailings to pass through the tailings reservoir from the intake opening to the discharge opening. In other embodiments, the conduit 304 may be a pipeline to transport tailings. Separate cathodes may be placed into the canal instead of the counter-rotating screws. The cathodes may be distinct from the means for causing the tailings to pass through the tailings reservoir and may only function as cathodes and, or may, as in the example in FIGS. 11-14, function as both a cathode and a conveyor. In other embodiments, more than two cathodes may be used to induce flocculation of the tailings.

Figure 15:
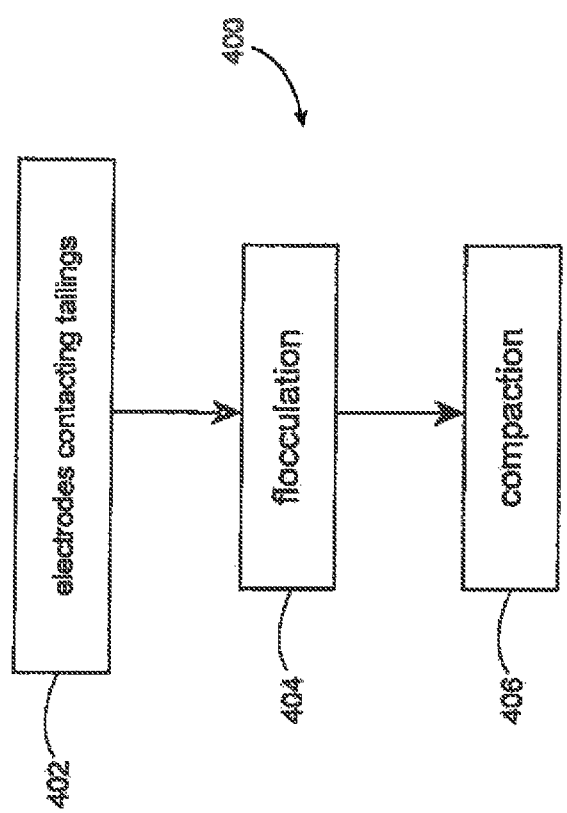
FIG. 15 is a flow diagram of a method of treating liquid tailings using electro-kinetics.

As shown in FIG. 15, in one embodiment of the present invention, tailings may be treated using flocculation and compaction. There is shown a method 400 of treating liquid tailings using electro-kinetics. At 402, at least two electrodes are caused to come into contact with the tailings. The electrodes may be placed into a tailings pond or ex-situ treatment cell or FFT/MFT may be moved into contact with the electrodes. At 404, flocculation of particles and releasing of water from the tailings is induced in the tailings by establishing an electrical field between the two electrodes. The two electrodes are connected to a source of electrical power having a variable voltage to create at least one cathode and at least one anode. Following the flocculation of particles, the flocculated solids are compacted and further water is released at 406 to create a compacted material having a minimum desired load bearing capacity. Compaction and further water release may be induced through the application of a second variable voltage; a reapplication of the variable voltage from the flocculation step, for example, at a higher variable voltage; or through a non-electrokinetic process such as natural consolidation or forced compaction, such as through the application of wicks or sand drains. The compaction and further water release step may be carried out at a separate location using separate electrodes to induce the second variable voltage. The separate location may be in situ in a tailings pond or ex-situ at additional treatment cells.

To reduce the size of tailings to a manageable size, MFT may be pumped into intermediate cells in which flocculation of the material may be applied prior to electrostriction of the material. Flocculation and water removal may be applied during transportation of MFT or FFT from location to location, for example using a processing cell such as described in FIGS. 11-14. The transportation of FFT may be challenging and steps would need to be taken to ensure that material does not settle out and damage any equipment used to transport the FFT.

Where fly ash tailings are treated, the flocculation step may be followed by compaction and further water removal in which the compaction step does not include the application of electrostriction. The properties of fly ash tailings may prevent the effective use of electrostriction to compact the tailings. Other techniques for compacting tailings such as those discussed throughout this specification may be used.

Electrokinetic experiments were performed in laboratory on MFT material produced from Syncrude's Mildred Lake Mine. In the embodiment discussed in the testing, the flocculation step and electrostriction steps were applied one after the other using a higher variable voltage during the electrostriction step. The results of this testing is discussed below.

The electrokinetic test cells used for the experiments in this study include a reactor which consists of an electrokinetic cell, two electrode compartments, two electrode reservoirs, a power supply, a multi-meter, flow control valves, and gas vents. The reactor was designed to simulate one-dimensional transport of contaminants under an induced electric potential and was also used to determine the compaction achieved under higher voltage gradients (up to 4.3 $V_{DC/cm}$) and the volume of water that can be recovered.

To perform the 1-D pretesting testing, a Plexiglas tube measuring approximately 3.8 cm in diameter and 14.2 cm long was filled with MFT. At the ends of the tube, filter paper discs were placed between the MFT and the porous stones capping each end. Each end was then sealed with an integrated end cap equipped with an electrode providing even distribution of voltage from one end of the tube to the other. MFT material was placed into the cell with no headspace. The voltage gradient can be varied up to 4.3 $V_{DC/cm}$, which is at the mid-range of the linear range of the equations for describing electrostriction. Water drainage was provided at the cathode end of the apparatus.

The 2-D test cells measure 20 cm high by 20 cm wide, by 5 cm deep. On either side of the test cells are located the anode and cathode in water-filled reservoirs. In the 2-D cell, approximately 0.5 cm of sand was place for drainage during the treatment. Across the top of the sand layer and over the plastic screens separating the electrode reservoirs from the sample, a geotextile material was placed and a silicone sealant applied where the fabric met the walls of the test cell to maintain separation of the materials. The MET was filled to a level of approximately 18 cm from the base of the cell. The remainder of the cell was filled with tap water to a height of approximately 18 cm from the base of the cell to mimic conditions in a tailings pond and ensure current flow throughout the MFT. This left approximately 1 cm of freeboard in the cell. The MFT was placed in the cell, placed in layers to minimize void spaces while filling. The MFT was measured at approximately 18 cm thick, with the electrode reservoirs filled with tap water to approximately the same level as the MFT. The voltage gradient could be applied up to 2.36 $V_{DC/cm}$ (236 $V_{DC/cm}$) with the available equipment and for the most part, the maximum voltage gradient was used.

Samples were obtained from each of the three pails to be tested for the following characteristics:

Moisture content per ASTM D2216;
Unconfined Compression Testing per ASTM 2166;
Testing of produced water for total Dissolved solids, pH, major ions (Ca, Mg, Na, K, $CO_3$, Cl, $SO_4$ and $HCO_3$),
Vane shear testing (ASTM 2573-08) as a screening tool to evaluate whether the MFT had achieved the desired strength; and,
Scanning electron microscopy to determine structure and the changes that result with treatment.

This testing was performed at the completion of the electro-kinetic compaction treatment.

Initial baseline measurements of applied voltage, voltage drop across a water filled and then a MFT filled cell and amperage were made. The electrode compartments, consisting of graphite electrodes, were connected to the compartments which were then filled with potable water (pH=7.7, redox potential=150 mV, electrical conductivity=280 mS/cm). The initial water elevations in both the reservoirs were kept the same in order to prevent a hydraulic gradient from forming across the cell that would be opposite the electrical field and affect the electro-osmotic direction of flow. Initial baseline voltage drop measurements were made to compare against the previous data to calculate changes in permittivity and as a result, the applied compactive pressure. The voltage, voltage drops, and current draw through the MFT sample as well as pH, redox potential, and electrical conductivity (EC) of the aqueous solutions in the water drained from the cathode reservoir were monitored during the testing. At the end of testing, aqueous solutions from both the cathode and anode compartment and reservoirs from several tests were combined for chemical analysis.

Dewatering of the MFT occurs as a result of a number of mechanisms:

Neutralization of the diffuse double layer; electrolytic decomposition of water and the electro-osmotic flow of reduced pH water from the anode to the cathode results in the neutralization of the point of zero charge of the soil minerals;
The compaction of the MFT itself through electrostriction, effectively squeezing water from the material; and
Potentially, gas generation displacing water from the pores.

Monitoring consisted of the following:

Voltage and amperage being supplied to the test cell;
Water drained during the application of the electrical field;
Voltage drop across the test cell (2-D only);
Other observations such as physical condition of the sample; and
The test cells were opened on a periodic basis to observe changes and on some occasions to measure bearing capacity using a Humbolt H-4212MH Pocket Shear Vane Tester.

The application of an electrical field generally resulted in the migration of water to the cathode within 2 hours of the initiation of the electrical field. Associated with the release of water, the MFT is observed to shrink, and vapor bubbles begin to form. Within 48 hours of the initiation of the electrical field, water is released ranging from 24 to 34% of the sample volume as summarized below.

A 1-D test set-up was used to determine if there may be an optimal voltage gradient for electrostrictive treatment. Three tests were planned, but after conducting the second test, it was apparent that the ideal voltage gradient may be outside the range allowed by the equipment. Two voltage tests were conducted: 1) 2.92 $V_{DC/cm}$ and 2) 3.2 $V_{DC/cm}$. An additional test at approximately 2.5 $V_{DC/cm}$ was planned, but cancelled when the trend in Table 1 was observed.

TABLE 1

Comparison of 1-D testing Showing Power Consumption and Water Production for Two Different Voltage Gradients.

| Elapsed Time (hrs) | Voltage (Volts) | Amperage (Amps) | Cumulative Power Input (KW-hr/m³) | Cumulative Water Production (ml) | % Cumulative Water Production |
|---|---|---|---|---|---|
| 3.2 Volts$_{DC}$/cm | | | | | |
| 0:00:00 | 60.1 | 0.04 | 0.00 | | |
| 0:05:00 | 60.3 | 0.03 | 0.05 | | |
| 1:00:00 | 60.2 | 0.01 | 0.58 | | |
| 2:35:00 | 60.2 | 0.01 | 1.10 | | |
| 21:50:00 | 60.2 | 0.01 | 4.27 | 29 | 19 |
| 22:55:00 | 60.2 | 0.01 | 4.45 | 31 | 20 |
| 44:15:00 | 60.2 | 0 | 7.95 | 53 | 34 |
| 2.92 Volts$_{DC}$/cm | | | | | |
| 0:00:00 | 56.8 | 0.05 | | | |
| 0:40:00 | 56.8 | 0.06 | 0.52 | | |
| 2:20:00 | 56.8 | 0.06 | 2.07 | 29 | 19 |
| 3:15:00 | 56.8 | 0.05 | 2.92 | 33 | 22 |
| 21:25:00 | 56.8 | 0.01 | 17.01 | 36 | 24 |
| 22:40:00 | 56.8 | 0 | 17.20 | | |
| 23:00:00 | 56.8 | 0.01 | 17.20 | | |
| 24:25:00 | 56.8 | 0.02 | 17.42 | | |

While this represents a small data set, the indication is that operating at higher voltage gradients results in lower overall power consumption, and may result in greater water release.

With the application of the electrical field, effervescence was almost immediately observed at both the anode and the cathode. As discussed in relation to electrolysis and zero point charge, this would represent electrolytic breakdown of the water resulting in the production of oxygen gas at the anode and hydrogen gas at the cathode. It should also be noted that a faint chlorine gas odour was observed on several occasions when opening the treatment cell to inspect the sample for progress. From the publicly available information, there are chloride salts present in the MFT, and electrolysis would result in the conversion of chloride to chlorine gas as shown below.

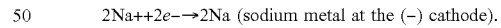

2Na++2e−→2Na (sodium metal at the (−) cathode).

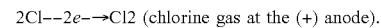

2Cl−−2e−→Cl2 (chlorine gas at the (+) anode).

These trace amounts are not believed to be harmful or be of concern at full scale treatment production.

It was observed that within 15 minutes of the application of the electrical field that the MFT at the anode reservoir had begun to floc (i.e., the MFT had formed tuft-like particles, approximately 1-2 mm long) with the flocked material falling into the anode reservoir. It is believed that this flocking may be the result of one or a combination of two mechanisms: 1) the electrical field neutralizes the surface charge (or zeta potential) on the mineral surfaces, releasing the water; or 2) the generation of reduced pH at the anode through electrolysis, which migrates to the cathode, in turn also reduces the zeta potential to the point of zero charge ($P_{zc}$, estimated pH=3.5 to 3.6 for kaolinite; and 4 to 9.6 for illite).

At elapsed time 161:25 the following was observed. At the two electrode ends of the cell, the MFT still clings to the walls of the cell. The material at either end of the test cell is MFT that is squeezed against the Plexiglas™ wall is a result of the electrostriction force. However in the mid-section, the MFT shows signs of shrinkage, and the MFT has pulled away from the cell walls. There are significant differences in water levels at the two electrodes. This is a manifestation of the electro-osmotic pressure induced by the electric field, from which, the permeability of the treated MFT can be estimated. Using this, it may be possible to engineer the electro-osmotic hydraulic pressure to provide hydraulic containment for in situ treatment in the tailings pond. This has the potential of significantly lowering costs through the elimination of much of the treatment infrastructure associated with ex-situ treatment.

There was a vertical to sub-vertical orientation to the layering of the MFT reflecting the electrostrictive compression perpendicular to this direction, due to compactive forces from the anode to the cathode. This results in greater compaction perpendicular to the direction of this force.

The test cell had plainly evident shrinkage cracks that result from the electro-kinetic compaction (EKC) treatment, as well as the mineral precipitate that forms on the surface.

The electrical resistance and the resulting power draw over time for 2-D EKC application for test run MFT5 was calculated. As expected, resistance and power measurements were mirror images of each other. In general, after an initial drop in electrical resistance, there is a generally increasing resistance trend as the MFT is compacted. Since V=I·R and the voltage gradient is held essentially constant, as the resistance increases, the current draw decreases.

However, the current draw decreases as water is drained from the test cell. Electrostriction is dependent on the voltage gradient. Therefore according to the present invention maintaining water drainage while still maintaining the electrical circuit provides a means of minimizing the power consumption, and hence costs.

In this experiment, the highest power draw occurred during the first 20 hours of EKC treatment. During this period, the pH at the anode is decreasing and the low pH water is being electro-osmotically drawn through the MFT to the cathode. This results in the release of water from the MFT. It is generally recognized that electro-osmotic flow occurs at voltage gradients ranging from 1 to 2 $V_{DC/cm}$. Electrostriction occurs at voltage gradients of 2 $V_{DC/cm}$ and higher. From the perspective of compacting the MFT, there is little benefit in doing this where the water content is high. Water is considered an incompressible fluid and compaction theory informs us that it is better performed at more optimal moisture contents.

Compaction effort is a term used to denote a specific compaction operation. A specific compaction operation may specify the number of passes that a sheepsfoot roller moves over a section of fill. For this invention the compaction effort is defined as the applied compaction pressure multiplied by duration. Electrostrictive force is proportional to the square of the voltage gradient as noted above. Therefore, according to the present invention, it is desirable to maximize the voltage gradient and to apply the highest compactive force practical, to increase the bearing capacity while also reducing the moisture content. Unlike conventional compaction, the present invention does not seek to compact at the optimum moisture content. At a voltage gradient of 2.34 V/cm, the change in pressure is 4.69 kPa. At 4 $V_{DC/cm}$, the change in pressure is 19.7 kPa or almost 3 times higher than at a gradient of 2.34 $V_{DC/cm}$. Further, when the higher voltage gradient is applied at the latter stages of treatment, the power consumption is less. If compaction effort is defined as applied force times duration (kPa-hrs) the present invention provides a means of maximizing the compaction effort, while minimizing the time to achieve the desired bearing capacity. This operation can be performed in a manner where a higher compaction effort occurs at conditions of lower current draw (and hence lower power consumption).

The overall power consumption is reduced by operating at a lower voltage gradient initially and then increasing the voltage gradient as the electrical resistance increases. As well, when considering the compaction effort for the variable voltage application from the application of 1,330.6 kPa-hrs is to be compared to the 1,082 kPa-hrs at a constant voltage gradient of 2.34 VDC/cm. The experimented results indicate that 2.34 VDC/cm provides more than adequate compaction, so a reduced compaction effort to 1,082 kPa-hrs would result in a further reduction in energy consumption of 19.9%. The savings in energy arise by operating at higher voltage gradients (higher electrostrictive pressure) and higher electrical resistances. According to the present invention a continuous feedback loop on the applied current can be used to provide real-time control on the power input. In this way power consumption can be optimized in real time as the MFT is being treated using compaction effort as a guide.

Electro-osmotic velocities were calculated at 1.5 $V_{DC/cm}$ and 2.34 $V_{DC/cm}$ to determine whether a lower voltage gradient would impact on treatment time and costs. It was determined that the electro-osmotic flow velocity at 2.34 $V_{DC/cm}$ was 19% faster (or a 6 hour difference in pH wave travel time) than at a voltage gradient of 1.5 $V_{DC/cm}$. Therefore, a slower travel time in the electro-osmotic water release portion of the treatment is expected.

The 2-D test cell has septum ports spaced 5 cm apart that allow for the insertion of metal probes to measure voltage drops within the MFT as it is being treated. These voltage drops can be used to determine permittivity and the electrostrictive pressure. With this, real-time pressure measurements can be determined. This is important in the application of EKC, since electrostrictive (ES) forces can be both positive and negative, and monitoring requires that the forces result in compaction of the MFT. When the pressure becomes negative, the polarity can be reversed to increase the pressure.

Only a limited amount of EKC occurs during the first 24 hrs. yet the most significant power consumption occurs; greater compaction occurs during the period from 48 to approximately 96 hrs. Reversing the polarity also results in increasing the compaction pressure. As a result, the present invention comprehends that EKC be operated in a mode focusing on electro-osmosis to release water for approximately the first 24 hours, increasing the voltage gradient thereafter.

Unconfined compression testing was performed by obtaining samples from the 1 and 2-D test cells. For the 1-D cells, the sample was pushed from the apparatus and trimmed to form a right angle cylinder. For the 2-D cells, samples were prepared using two methods: 1) a tube was inserted into the MFT in the test cell apparatus, which allowed for some testing in different orientations; and, 2) the EKC treated MFT was removed from the test cell and re-molded into right-angle cylinders for testing.

The tests were performed not only to demonstrate that the required bearing capacity can be achieved, but also to evaluate variations in treatment. For example:

Variations in horizontal and vertical bearing capacities;
Changes in applied gradient; and
Variations in moisture content.

The application of the electrostrictive force is from anode to cathode. As a result, the unconfined compression test shows greater bearing capacity in the horizontal direction versus the vertical. This was seen in the failure planes in the unconfined compression testing. An observed main diagonal failure plane represented the failure occurring that is being measured as the bearing capacity. Observed subvertical failure planes were the result of the electrostrictive compactive force being applied horizontally across the sample.

Results from samples obtained from one test run (MFT2), where horizontal and vertical bearing capacities are compared are summarized below.

TABLE 2

Summary of comparing horizontal to vertical bearing capacities

| Identifier | Bearing Capacity (kPa) | Moisture Content (%) |
|---|---|---|
| MFT 2 Horizontal | 19,669.79 | 15.6 |
| MFT 2 Vertical | 10.53 | 58.2 |
| MFT 2 Horizontal | 987.05 | 43.99 |

Samples were tested after undergoing EKC treatment at 234 $V_{DC/cm}$, followed by treatment at 4.3 $V_{DC/cm}$. This was done by taking the MFT treated in the 2-D cell and then re-molding the treated material into the 1-D cell. This was done to see if there was a loss in bearing capacity on remolding and whether additional compaction be achieved. This test was to try to determine, if at full scale the removal of the treated MFT from the treatment cells would result in loss of bearing capacity and also whether material when remolded as fill could be effectively compacted. Presented below is a comparison of the bearing capacities from 2.34 $V_{DC/cm}$ and 4.3 $V_{DC/cm}$ treatments.

TABLE 3

Comparison of Bearing Capacities achieved by Differing Voltage Gradients

| Identifier | Bearing Capacity (kPa) | Moisture Content (%) |
|---|---|---|
| MFT4 2.3 $V_{DC}$/cm | 33.923 | 72.7 |
| MFT4 4.3 $V_{DC}$/cm | 66.089 | 45.91 |

Vane shear testing, as noted above was used as both a screening tool to add to the database on bearing capacities. Vane shear testing as a screening tool, involved opening up the test cell during treatment and obtaining the data. At the completion of treatment, the vane shear measurements were made both in the test cell and as with the unconfined compression tests, then remolded material in a bowl.

TABLE 4

Summary of Vane Shear Bearing Capacity Tests

| Sample ID | Bearing Capacity (kPa) |
|---|---|
| MFT2 Anode | 19.6 |
| MFT2 Mid | 137.3 |
| MFT2 Cathode | 88.3 |
| MFT3 Anode | 39.2 |
| MFT3 Cathode | 49.0 |
| MFT4$_{10}$ -1 | 25.5 |
| MFT4$_{10}$ -2 | 19.6 |
| MFT4$_{10}$ -3 | 21.6 |

TABLE 4-continued

Summary of Vane Shear Bearing Capacity Tests

| Sample ID | Bearing Capacity (kPa) |
|---|---|
| MFT4$_{10}$ -4 | 25.5 |
| MFT4$_{10}$ -5 | 31.4 |
| MFT5-1 | 88.3 |
| MFT5-2 | 58.8 |
| MFT5-3 | 49.0 |

Figure 16:
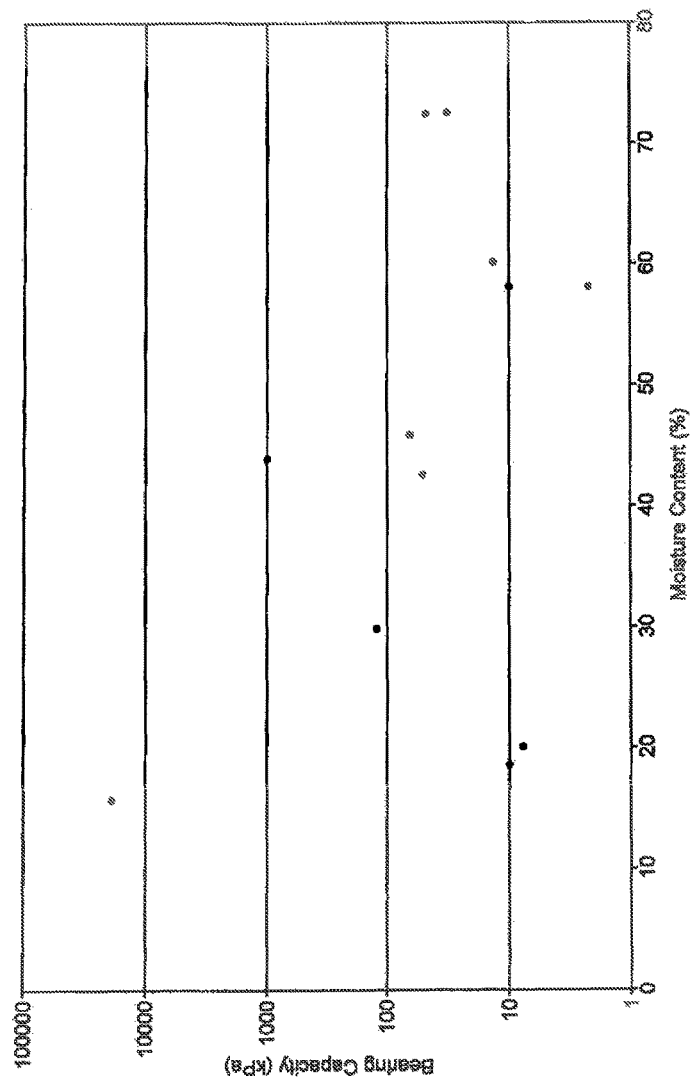
FIG. 16 shows the distribution of bearing capacities and moisture content for MFT after flocculation and electrostriction.

At the completion of each unconfined compression test, the samples were weighed and placed in a muffle furnace for drying and then re-weighed to determine moisture content. This data is presented graphically in FIG. 16, and shows that moisture contents on the samples that achieved 20 kPa or better, ranged between 30 and 50%. Also there appears to be a general trend of increasing bearing capacity with decreasing moisture content. Therefore, according to the present invention, it is believed that significant effort to reduce moisture content is not required to achieve the required bearing capacities of 5 to 10 kPa.

The specific gravity testing was complicated by the porous nature of the dried treated MFT. The tests were run two ways: 1) the dried treated MFT was ground using a mortar and pestle and inserted in the pycnometer for weighing; and 2) small pieces of the dried treated MFT were inserted into the pycnometer for weighing. In both cases the results were lower than anticipated. It is believed that even in its ground up state, there remains significant air filled pore spaces that cannot be fully water filled to obtained accurate determinations. The data from this testing is summarized below in Table 5.

TABLE 5

Specific Gravity Values

| Empty Pycnometer Mass | Pycnometer + Dry Soil Mass | Pycnometer + Dry Soil + Water Mass | Pycnometer + Water Mass | Specific Gravity UIC | Specific Gravity (Lambe) |
|---|---|---|---|---|---|
| 37.6 | 47.6 | 122.5 | 119.6 | 1.408 | 1.406 |
| 32 | 42 | 119.6 | 117.6 | 1.25 | 1.248 |

Water recovered during the EKC process was analyzed for the following parameters:

| Barium | Copper | Nickel | Calcium | Magnesium |
|---|---|---|---|---|
| Manganese | Potassium | Sodium | Boron | Zinc |
| Chloride | Sulfate | Carbonate | Bicarbonate | |

Another parameter to monitor is effect of naphthenic acids. Naphthenic acids are natural constituents of petroleum, formed through the oxidation of naphthenes, representing as much as 4% of raw petroleum by weight, and represents an important component of the waste generated during petroleum processing. In the Athabasca oil sands, naphthenic acids become dissolved and concentrated in tailings water as a result of the hot-water process used to extract bitumen from mined oil sands. A consequence of the hot water extraction process is that the alkalinity (pH=8) promotes solubilization of naphthenic acids (pKa~5), thereby concentrating them as mixtures of sodium salts in aqueous tailings (sodium naphthenate). The actual amounts of naphthenic acids in the tailings ponds are typically between 80 and 110 mg/l.

The present invention contemplates monitoring leaching of naphthenic acid in the vicinity of the cathode and evaluating if compounds form, such as sodium naphthenic. Adequate treatment of any such compounds is desirable.

Summarized below are the major ion data in both mg/l and meq/l.

TABLE 6

Major Ion Data Evaluation

| Calcium (Ca$^{+2}$) | | | Sodium (Na$^+$) | | |
|---|---|---|---|---|---|
| Mg/l | Meq/l | % | Mg/l | Meq/l | % |
| 11.5 | 0.574 | 0.58 | 2040 | 88.74 | 89.25 |

| Potassium (K$^+$) | | | Magnesium (Mg$^{2+}$) | | | Total Cations |
|---|---|---|---|---|---|---|
| Mg/l | Meq/l | % | Mg/l | Meq/l | % | Meq/l |
| 259 | 6.62 | 6.66 | 42.5 | 3.50 | 3.52 | 99.43 |

| Carbonate (CO$_3^{2-}$) | | | Bicarbonate (HCO$_3^-$) | | |
|---|---|---|---|---|---|
| Mg/l | Meq/l | % | Mg/l | Meq/l | % |
| 4160 | 138.53 | 92.1 | 680 | 11.15 | 7.41 |

| Sulphate (SO$_4^{2-}$) | | | Choride (Cl$^-$) | | | Total Anions |
|---|---|---|---|---|---|---|
| Mg | Meq/l | % | Mg/l | Meq/l | % | Meq/l |
| 12 | 0.25 | 0.17 | 17 | 0.48 | 0.32 | 150.4 |

Charge/balance error = −20.4; pH = 12.2; TDS = 7222.

The charge balance error shows that there are more anions than cations. This is to be expected given that water is recovered from the cathode reservoir where the water and anions are drawn to the cathode reservoir as a result of the attractive forces. Given the faint chlorine odour, it is expected that chloride is electrolyzed to chlorine gas. It is also believed that the water chemistry is also out of balance because of the fate of sodium chloride. As noted above, sodium is expected to be consumed in the reaction of naphthalenic acid to sodium naphthenate:

$$C_9H_{17}COOH + Na \rightarrow C_{10}H_{17}NaO_2$$

This testing has shown that electro-kinetic compaction treatment according to the present invention is effective for treating liquid tailings. The treatment described in the experiments applied a combination of a number of mechanisms: electro-osmosis, electro-migration and electrostriction that when combined and appropriately sequenced can cost-effectively treat tailings. These experiments indicate that the treatment of MFT and FFT using this process will meet the requirements and goals of oil sands producers. The testing consistently achieved 100 kPa bearing pressures, well above the requirements imposed on the oil sands producers of treating their tailings to a bearing capacity of 5 kPa by 2012 and 10 kPa by 2015. Because the electrical resistance varies throughout the treatments tested, the voltage gradients and as a result the electro-osmotic flow and compative forces can be varied to take place when the electrical resistance is at its greatest and hence the power draw is minimized to produce higher voltage gradients. The present invention also provides that multi-stage application of electro-kinetics processes, such as the application of separate flocculation and electrostriction steps may be employed to achieve the same benefits. Due to the volume of material being treated, a few pennies savings per cubic meter can result in significant overall cost savings or improved operating margins.

In one embodiment, MFT/FFT are subjected to the application a flocculation step prior to the application of an electrostriction step through the application of a single electric field. The applied voltage gradient is increased over time. During the flocculation step the application of the electric field is applied in a preferred voltage gradient range between 100V/m and 200V/m. Preferably, the voltage gradients increased slowly over time. For example, the voltage gradient might begin at 100V/m and will increase as flocculation occurs until it eventually reaches 400 V/in at the conclusion of the electrostriction step. As the process continues, the voltage gradient will preferably be increased until it reaches a value around 400V/m. To achieve even results, it is preferable that increases to the voltage gradient are done slowly. As the voltage gradient increases, the application of the electric field will first cause flocculation and will eventually cause electrostriction of the material. Electrostriction will generally occur at voltage gradients above 200V/m. An initial voltage gradient of 50V/m or lower is possible, but lower voltage gradients would mean that the process as a whole would take longer. Increasing the voltage above 400V/m during the electrostriction step is also possible, but a voltage gradient higher than 400V/m may result in inefficiencies because the end product would achieve a level of compactification higher than that is required by current Alberta regulations. The distance between the electrodes will have an impact on the time it takes for flocculation and electrostriction to occur. The farther the distance between the electrodes the longer the process will take. The exact voltage gradient to be applied at any time can be determined by a feedback loop which is dependent on observations of the properties of the materials being flocculated and compacted. Generally, the voltage gradient will increase over time, but those increases may not be linear.

Although the foregoing description has been made with respect to preferred embodiments of the present invention it will be understood by those skilled in the art that many variations and alterations are possible without departing from the broad spirit of the claims attached. Some of these variations have been discussed above and others will be apparent to those skilled in the art.

The embodiments of the invention in which an exclusive property or privilege is claimed are defined as follows:

1. A method of treating liquid tailings using electro-kinetics, the method comprising the steps of:
   a. Causing at least two electrodes to come into contact with the liquid tailings;
   b. Inducing flocculation of particles in the tailings and releasing water from the tailings by establishing an electrical field between said at least two electrodes, the electrodes being connected to a source of electrical power having a variable voltage to create at least one cathode and at least one anode; and
   c. Compacting flocculation solids and removing further water released from said compacting flocculation solids to create a compacted material having a minimum desired load bearing capacity.

2. The method of claim 1 wherein the tailings are at least one of oil sands extraction tailings and fly ash tailings.

3. The method of claim 1 wherein said flocculation step further comprises passing the tailings through a conduit containing the at least two electrodes.

4. The method of claim 3 in which the conduit is a canal.

5. The method of claim 3 which the at least two electrodes are augers.

6. The method of claim 3 in which said compaction step further comprises placing said flocculated solids into a treatment cell or tailings pond and applying a second variable voltage to the flocculated solids to compact the flocculated solids through electrostriction.

7. The method of claim 6 in which the second variable voltage is created by a second pair of at least two electrodes which are placed into the treatment cell or tailings pond.

8. The method of claim 6 in which the second variable voltage applied during the compaction step is higher than the variable voltage applied during the flocculation step.

9. The method of claim 8 in which the second variable voltage is greater than 2 $V_{DC/m}$.

10. The method of claim 8 in which the variable voltage during the flocculation step is between 1-2 $V_{DC/m}$.

11. The method of claim 3 in which said compaction step further comprises placing said flocculated solids into a tailings pond and allowing the flocculated solids to naturally consolidate.

12. The method of claim 1 wherein said compaction step includes using electrostriction to compact the flocculated solids.

13. The method of claim 12 further including the step of inserting a drain or wick into said flocculated solids to permit pore water to be expressed from said compacting solids.

14. The method of claim 1 wherein said compaction step includes using gravity loading to further compact said flocculated solids.

15. The method as claimed in claim 14 further including the step of removing water from tailings as said solids are compacted.

16. The method as claimed in claim 15 wherein said water is pumped out of said tailings.

17. The method as claimed in claim 16 wherein said electrode includes an associated pump, electrically isolated from said electrode, to remove said water.

18. The method of claim 17 wherein the pump is located within a hollow cathode.

19. The method of claim 1 in which the tailings are located in situ at a tailings pond, the method further including the step of partitioning said tailings pond to create at least one cell, and wherein said step of causing the at least two electrodes to come into contact with the tailings comprises placing said electrodes within said cell.

20. The method of claim 19 further including the step of partitioning said tailings pond into a plurality of cells.

21. The method of claim 20 wherein said cells are formed by sheet metal pilings.

22. The method of claim 21 wherein said sheet metal pilings are electrically connected to said source of power and thereby become one of said electrodes.

23. The method of claim 22 wherein said electrical field gradient is a substantially uniform field between said electrodes.

24. The method of claim 1 further including the step of sampling said tailings to determine one or more electrical properties, and using said measured electrical properties to control the output from the source of power.

25. The method of claim 24 wherein said electrical properties vary as said solids compaction process progresses, and said voltage is varied as said compaction progresses.

26. The method of claim 1 further including the step of measuring the electrical properties of said tailings over time and adjusting said variable voltage across said electrodes in response to changes detected in said measured electrical properties.

27. The method of claim 26 wherein the at least two electrodes are used to induce a variable voltage during the compaction step to cause electrostriction of the flocculated fluids and the variable voltage applied during the electrostriction step is higher than the variable voltage applied during the flocculation step.

28. The method of claim 1 wherein said source of power is at least one transformer.

29. The method of claim 28 wherein said at least one transformer is operatively connected to a computer to permit the power from said transformer to be controlled.

30. The method of claim 29 wherein said controller includes a remote access controller.

31. The method of claim 1 wherein said predetermined load bearing capacity of said compacted solids is about 5 kPa or more.

32. The method of claim 1 wherein the flocculation of the solids within the tailings is induced by one or more of an AC, DC or EM-induced electrical field.

33. The method of claim 32 in which the flocculation of the solids within the tailings is induced by alternating current and in which the anode and cathode are operating 180° out of phase with each other.

34. The method of claim 1 wherein said electrical field gradient has a range from about 0.3 volt per centimeter to about 4 volt per centimeter.

* * * * *